United States Patent
Tsuruoka et al.

(10) Patent No.: US 8,081,594 B2
(45) Date of Patent: Dec. 20, 2011

(54) EXTENSION SUBORDINATE MACHINE SYSTEM AND SIGNAL RELAYING METHOD

(75) Inventors: Rie Tsuruoka, Kanagawa (JP); Toshiaki Oodachi, Kanagawa (JP); Yoshiteru Hirano, Kanagawa (JP); Yoshiyuki Shiozaki, Kanagawa (JP); Naoki Uchida, Kanagawa (JP); Masafumi Shiohara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 436 days.

(21) Appl. No.: 12/516,773

(22) PCT Filed: Nov. 22, 2007

(86) PCT No.: PCT/JP2007/072632
§ 371 (c)(1),
(2), (4) Date: May 28, 2009

(87) PCT Pub. No.: WO2008/065957
PCT Pub. Date: Jun. 5, 2008

(65) Prior Publication Data
US 2010/0067429 A1    Mar. 18, 2010

(30) Foreign Application Priority Data
Nov. 30, 2006 (JP) .................. 2006-324687

(51) Int. Cl.
*H04J 3/08* (2006.01)
(52) U.S. Cl. ........................... 370/315; 370/252
(58) Field of Classification Search ............. 370/315, 370/318, 252, 253
See application file for complete search history.

(56) References Cited

U.S. PATENT DOCUMENTS

| 6,025,949 | A | 2/2000 | Anderson | |
|---|---|---|---|---|
| 6,298,242 | B1 | 10/2001 | Schiff | |
| 7,343,102 | B2 | 3/2008 | Tomofuji | |
| 7,437,069 | B2 | 10/2008 | Deguchi | |
| 2007/0197258 | A1 | 8/2007 | Oda | |
| 2009/0092072 | A1* | 4/2009 | Imamura et al. | 370/315 |
| 2009/0103472 | A1* | 4/2009 | Ni et al. | 370/315 |
| 2009/0109892 | A1* | 4/2009 | Oyman et al. | 370/315 |
| 2009/0109893 | A1* | 4/2009 | Gopal | 370/315 |

FOREIGN PATENT DOCUMENTS

JP    01-221972    9/1989
(Continued)

OTHER PUBLICATIONS

International Search Report dated Feb. 5, 2008.
(Continued)

*Primary Examiner* — Brian Nguyen
(74) *Attorney, Agent, or Firm* — Dickinson Wright PLLC

(57) ABSTRACT

An extension subordinate machine system enabling high-accuracy correction of the cable loss by adjusting the gain by using the pilot signal and further enabling high-accuracy correction of the loss caused by distribution by a distributor even when a relay device adaptor is connected to the extension subordinate machine through the distributor. With this system, a main machine control section (201) outputs a pilot signal generated by a pilot signal generating section (203) when a switching section (205) sets a measurement mode. A pilot detecting section (215) detects the reception level. A control section (216) detects the pilot signal and sets the attenuation factor according to the reception level of the detected pilot signal. A variable attenuator (206) attenuates the up-link signal and the down-link signal at the set attenuation factor to adjust the gain.

6 Claims, 16 Drawing Sheets

FOREIGN PATENT DOCUMENTS

| | | |
|---|---|---|
| JP | 04-082432 | 3/1992 |
| JP | 07-015718 | 1/1995 |
| JP | 07-221700 | 8/1995 |
| JP | 07-245580 | 9/1995 |
| JP | 2000-151477 | 5/2000 |
| JP | 2000-152210 | 5/2000 |
| JP | 2003-505972 | 2/2003 |
| JP | 2004-048141 | 2/2004 |
| JP | 2004-120546 | 4/2004 |
| JP | 2004-215191 | 7/2004 |
| JP | 2004-215192 | 7/2004 |
| JP | 2004-274265 | 9/2004 |
| JP | 2005-045715 | 2/2005 |
| JP | 2005-204026 | 7/2005 |
| JP | 2006-197459 | 7/2006 |
| WO | 2006/006320 | 1/2006 |

OTHER PUBLICATIONS

Korean Office Action dated Nov. 23, 2010.

* cited by examiner

FIG.11A

AD VALUE

REFERENCE AD VALUE | 1 | 0 | 1 | 0 |

FIG.11B

N-TH VALUE SAVED
1101 ↓

AD VALUE | 1 | | | |
REFERENCE AD VALUE | 1 | 0 | 1 | 0 |

FIG.11C (N+1)-TH VALUE SAVED
1101  #1102 ↓

AD VALUE | 1 | 0 | | |
REFERENCE AD VALUE | 1 | 0 | 1 | 0 |

FIG.11D (N+α)-TH VALUE SAVED
1101 #1102 #1103 #1104 ↓

AD VALUE | 1 | 0 | 1 | 0 |
REFERENCE AD VALUE | 1 | 0 | 1 | 0 |

AD VALUE | 1 | 0 | 1 | 0 |

↕

REFERENCE AD VALUE | 1 | 0 | 1 | 0 |

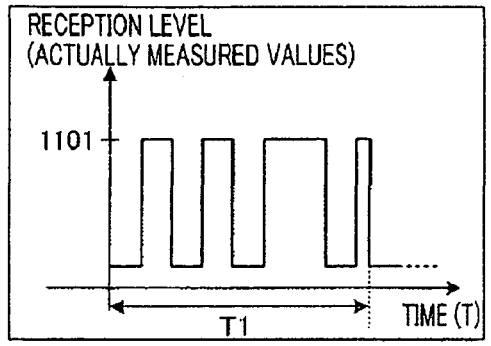 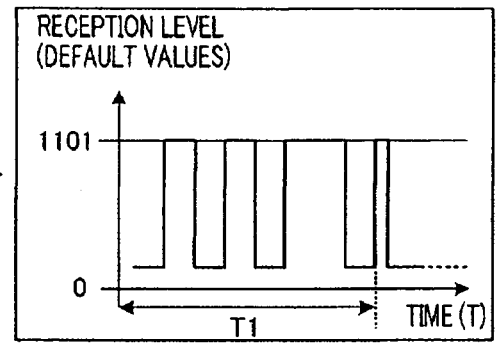
FIG.12A  FIG.12B
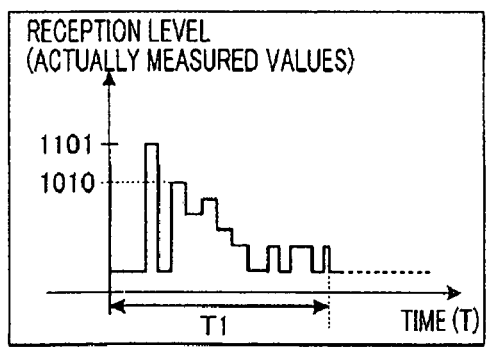 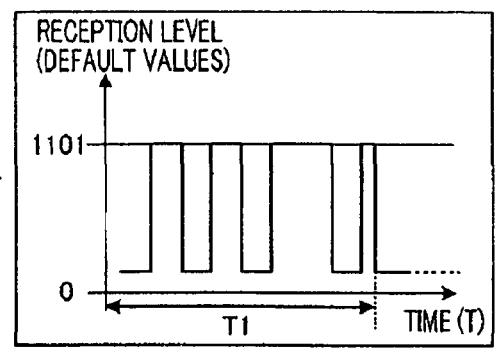
FIG.13A  FIG.13B

EXTENSION SUBORDINATE MACHINE SYSTEM AND SIGNAL RELAYING METHOD

TECHNICAL FIELD

The present invention relates to an extension slave unit system and signal relay method for enabling radio communication in a poor radio wave environment such as the indoor environment.

BACKGROUND ART

A radio relay apparatus, also referred to as a "repeater" or "booster," receives and amplifies signals transmitted from a base station apparatus and transmits the signals into the coverage area, and also receives and amplifies signals transmitted from a communication terminal apparatus located in the coverage area and transmits the signals to the base station apparatus, in order to make a radio wave dead zone a radio communicable area.

Furthermore, a mobile communication relay apparatus disclosed in Patent Document 1 is known as an apparatus to make a radio wave dead zone a communicable area. In slave unit side 1 According to Patent Document 1, antenna modules 6-1, 6-2, . . . , 6-n provided in respective slave units are cascaded via input/output terminal 2, wiring coaxial cables 3-0, 3-1, . . . , 3-(n–1) and high-frequency couplers 4-1, 4-2, . . . , 4-n.

In such a mobile communication relay apparatus, when a plurality of slave units (i.e. antenna modules) are cascaded to slave unit side 1A, downlink transmission power outputted from the slave units is preferably set uniform between all slave units. Therefore, the degree of coupling Ci of high-frequency couplers 4-1, 4-2, . . . , 4-n with each slave unit is set with unique values, depending on the routing lengths and so on of wiring coaxial cables 3-0, 3-1, 3-2, . . . , 3-(n–1), 15-1, 15-2, . . . , 15-n. When downlink transmission power is distributed to each slave unit in this way, the power transmitted from antenna 10 depends only upon the deviation of the lengths of wiring coaxial cables 15-1 to 15-n, and therefore transmission power can be supplied to all slave units, at substantially the same level, without causing any problem by taking into account only the wiring lengths of coaxial cables upon distributing slave units.

Furthermore, the mobile communication relay apparatus shown in FIG. 6 of Patent Document 1 is further provided with BPF 9 and amplifier 12 having a variable gain function right below a downlink antenna, so as to control the output power of amplifier 12 autonomously by a detection signal of detection circuit 12a. In this way, the deviation of downlink transmission power, which depends upon the lengths of the coaxial cables, can be improved by adjusting the amplifier gains of the individual slave units.

Patent Document 1: Japanese Patent Application Laid-Open No. 2004-215191

DISCLOSURE OF INVENTION

Problems to be Solved by the Invention

However, the conventional apparatus discloses no signal source for gain adjustment to correct the gains of slave units, resulting in a problem that cable loss cannot be corrected accurately.

It is therefore an object of the present invention to provide an extension slave unit system and signal relay method that are capable of correcting cable loss accurately by adjusting gain using pilot signals and correcting the loss produced upon distribution by a distributor accurately, even when a relay apparatus adapter and an extension slave unit apparatus are connected via a distributor.

Means for Solving the Problem

The extension slave unit system of the present invention is an extension slave unit system provided with a relay apparatus adapter and an extension slave unit apparatus connected with the relay apparatus adapter via a transmission path adopting a configuration with the relay apparatus adapter including: a pilot signal generation section that generates a pilot signal; and a switching section that switches between transmission of the pilot signal generated to the extension slave unit apparatus, a relay of a signal received by a relay apparatus to the extension slave unit apparatus and a relay of the signal received by the extension slave unit apparatus to the relay apparatus, and the extension slave unit apparatus including: a reception level detection section that detects a reception level of the signal received via the transmission path; a pilot signal reception decision section that decides whether or not the pilot signal has been received based on the detected reception level; a gain adjustment section that adjusts, when the pilot signal reception decision section decides that the pilot signal has been received, a gain of the signal relayed based on the reception level of the received pilot signal; and a distribution section that distributes a signal transmitted from the relay apparatus adapter through the relay to the other extension slave unit apparatus, wherein the gain adjustment section adjusts a gain of the signal transmitted by the relay from the relay apparatus adapter before distribution by the distribution section.

The signal relay method of the present invention includes: a step of a relay apparatus adapter generating a pilot signal; a step of the relay apparatus adapter switching between transmission of the pilot signal generated to the extension slave unit apparatus, a relay of a signal received by a relay apparatus to the extension slave unit apparatus and a relay of the signal received by the extension slave unit apparatus to the relay apparatus; a step of the extension slave unit apparatus detecting a reception level of the signal transmitted, a step of the extension slave unit apparatus deciding whether or not the pilot signal has been received based on the reception level detected; a step of the extension slave unit apparatus adjusting, upon deciding that the pilot signal has been received a gain of the signal through the relay based on the reception level of the received pilot signal; and a step of transmitting the signal through the relay whose gain has been adjusted from the extension slave unit apparatus to another party of communication.

ADVANTAGEOUS EFFECT OF THE INVENTION

The present invention provides an advantage of accurately correcting cable losses by adjusting gain using a pilot signal and accurately correcting, even when a relay apparatus adapter and an extension slave unit apparatus are connected via a distributor, losses produced during the distribution by the distributor.

BRIEF DESCRIPTION OF DRAWINGS

FIG. 11 shows a memory according to Embodiment 1 of the present invention;

FIG. 12 shows a method of comparing AD values and reference AD values according to Embodiment 1 of the present invention;

FIG. 13 shows a method of comparing AD values and reference AD values according to Embodiment 1 of the present invention;

BEST MODE FOR CARRYING OUT THE INVENTION

Hereinafter, embodiments of the present invention will be explained in detail with reference to the accompanying drawings.

Embodiment 1

Figure 1:
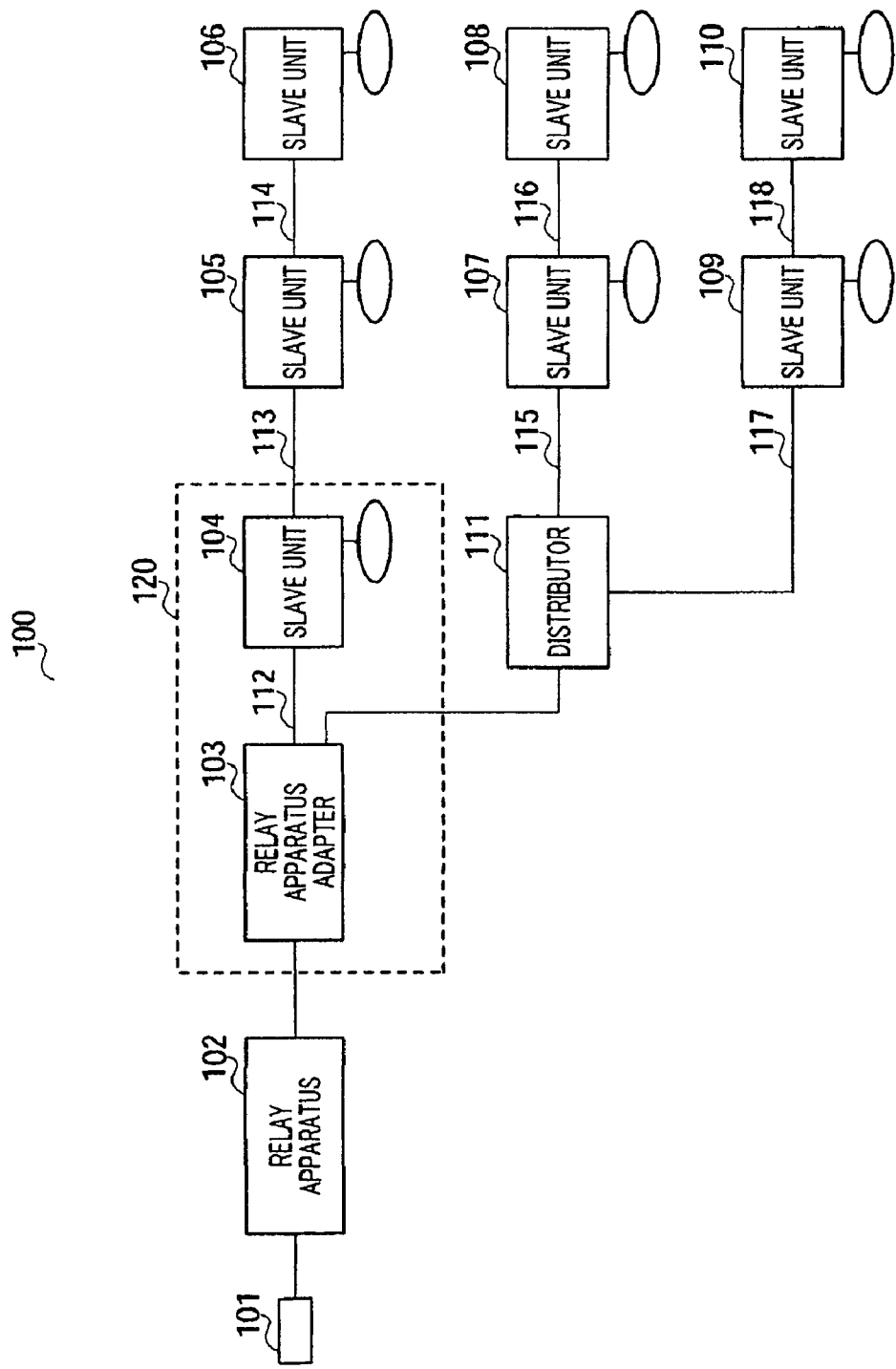
FIG. 1 shows an extension system according to Embodiment 1 of the present invention.

FIG. 1 is a block diagram showing a configuration of extension system 100 according to Embodiment 1 of the present invention. Relay apparatus adapter 103 and slave unit 104 (i.e. extension slave unit apparatus) constitute extension slave unit system 120.

Relay apparatus 102 outputs a downlink signal received by antenna 101, which is an RF signal transmitted from a base station apparatus (not shown), to relay apparatus adapter 103. Furthermore, relay apparatus 102 transmits an uplink signal received as input from relay apparatus adapter 103 to the base station apparatus (not shown) from antenna 101. Here, the state in which an uplink signal or downlink signal is relayed by relay apparatus 102 is referred to as "operation mode."

Relay apparatus adapter 103 supplies power to slave units 104 to 110 and also generates a pilot signal. Furthermore, relay apparatus adapter 103 selects one of the pilot signal that is generated and the downlink signal received as input from relay apparatus 102, and outputs the selected signal. Furthermore, relay apparatus adapter 103 outputs the uplink signal received as input from slave unit 104 or distributor 111 to relay apparatus 102. Here, a state in which the pilot signal generated by relay apparatus adapter 103 is transmitted from relay apparatus adapter 103 to slave units 104 to 110 is referred to as "measurement mode." The detailed configuration of relay apparatus adapter 103 will be described later.

Slave unit 104 adjusts the gain of the downlink signal received as input from relay apparatus adapter 103 via coaxial cable 112, transmits the downlink signal with adjusted gain to a communication terminal apparatus (not shown) under the control and also outputs the signal to slave unit 105. Furthermore, slave unit 104 decides whether or not a pilot signal has been received from relay apparatus adapter 103 via coaxial cable 112, and, upon deciding that the pilot signal has been received, adjusts the gains of the uplink signal and downlink signal based on the reception level of the received pilot signal. Since the configurations of slave units 105 to 110 are the same as slave unit 104, their explanations will be omitted. Furthermore, the detailed configurations of slave units 104 to 110 will be described later.

Distributor 111 distributes the downlink signal and pilot signal received as input from relay apparatus adapter 103 and a power voltage to slave unit 107 and slave unit 109. Furthermore, distributor 111 outputs uplink signals received as input from slave unit 107 and slave unit 109 to relay apparatus adapter 103.

Figure 2:
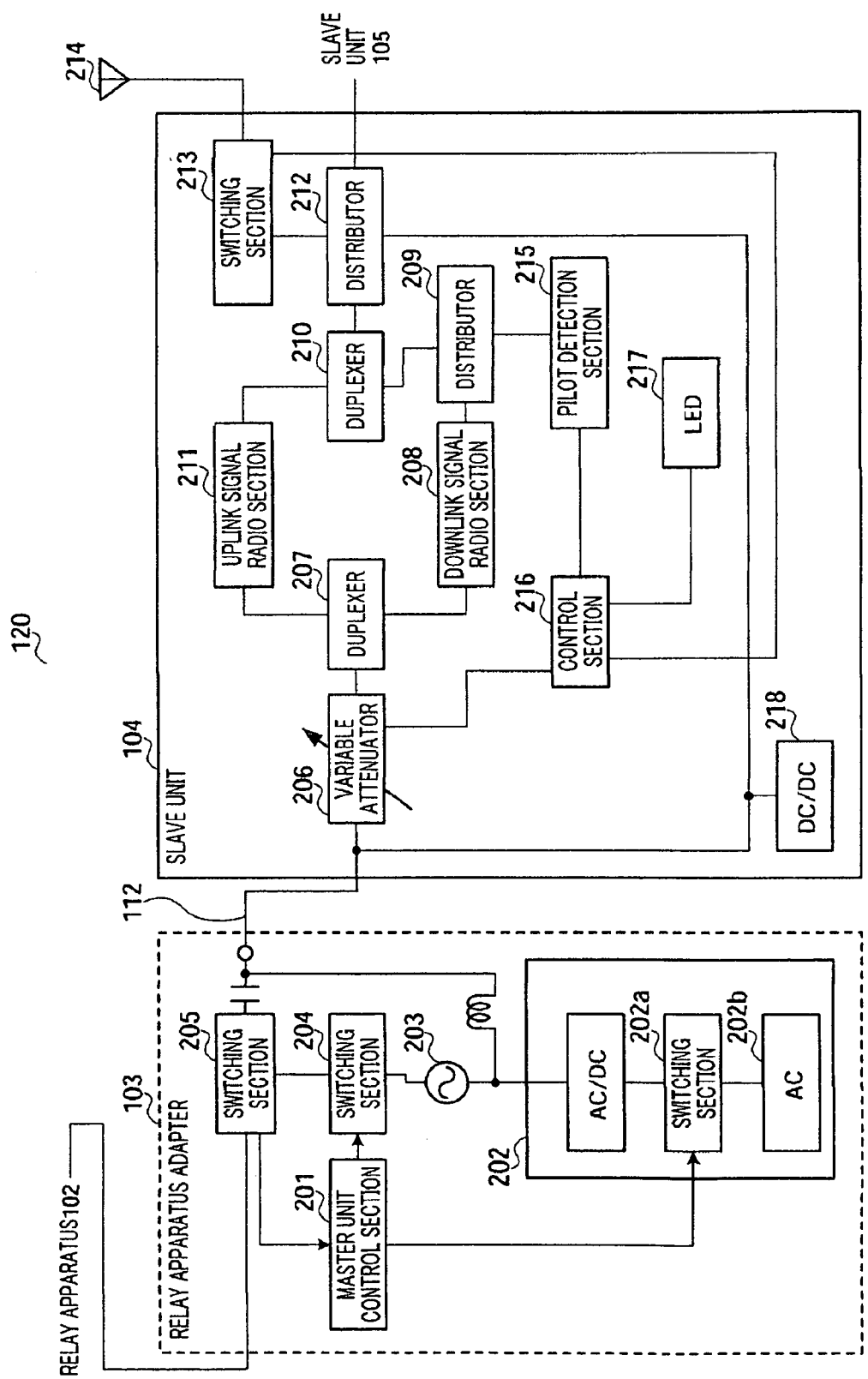
FIG. 2 shows an extension slave unit system according to Embodiment 1 of the present invention.

Next, the respective configurations of relay apparatus adapter 103 and slave unit 104 constituting extension slave unit system 120 will be explained using FIG. 2. FIG. 2 shows the configuration of extension slave unit system 120.

First, the configuration of relay apparatus adapter 103 will be explained.

Upon detecting that switching section 205 (described later) has switched the operation mode to the measurement mode, master unit control section 201 controls power control section 202 to turn off the power and then turn on the power, and commands switching section 204 to output a pilot signal.

Power control section 202 supplies power to DC/DC 218 via coaxial cable 112 under the control of master unit control section 201 and also supplies power to pilot signal generation section 203.

Pilot signal generation section 203, which is a pilot signal generation means, generates a pilot signal by receiving a supply of power from power control section 202 and outputs the generated pilot signal to switching section 204. The amplitude, frequency and modulation scheme of the pilot signal generated by pilot signal generation section 203 are not particularly limited.

Switching section 204 switches between outputting a pilot signal and not outputting a pilot signal, that is, switches on and off the output of pilot signal generation section 203 under the control of master unit control section 201, thereby generating signals in a specific pattern, and outputs signals generated in a specific pattern to variable attenuator 206 via coaxial cable 112. Here, the specific pattern is generated to allow slave unit 104 to recognize the measurement mode in which the gain on the slave unit 104 side is adjusted is being adopted, and prevent slave unit 104 from erroneous operation. Switching section 204 is not limited to switching whether or not to output a pilot signal and may also generate a signal of a specific pattern by making the output level of a pilot signal variable.

Switching section 205 can switch between the operation mode and the measurement mode. To be more specific, upon switching to the operation mode, switching section 205 performs a relay, which is the processing of transmitting a downlink signal received as input from relay apparatus 102 to variable attenuator 206 via coaxial cable 112, and also performs a relay, which then is the processing of transmitting an uplink signal received as input from variable attenuator 206 to relay apparatus 102 via coaxial cable 112. On the other hand, upon switching to the measurement mode, switching section 205 transmits a pilot signal received as input from switching section 204 to variable attenuator 206 via coaxial cable 112.

Next, the configuration of slave unit 104 will be explained. The configuration of slave unit 105 to slave unit 110 is the same as slave unit 104 except that a downlink signal and pilot signal are received as input from another slave unit to variable attenuator 206, an uplink signal is sent out from variable attenuator 206 to another slave unit and power is supplied from another slave unit to DC/DC 218, and therefore the configuration of slave unit 104 alone will be explained.

Variable attenuator 206, which is a gain adjusting means, adjusts gain by attenuating a pilot signal and a downlink signal received as input from switching section 205 of relay apparatus adapter 103 via coaxial cable 112 and an uplink signal received as input from duplexer 207, at the attenuation factors set in control section 216. Variable attenuator 206 then outputs the attenuated pilot signal and downlink signal to duplexer 207 and also outputs the attenuated uplink signal to switching section 205 of relay apparatus adapter 103 via coaxial cable 112. Furthermore, variable attenuator 206 can fix or make variable the attenuation factors.

Duplexer 207 outputs the pilot signal and downlink signal received as input from variable attenuator 206 to downlink signal radio section 208 and also outputs an uplink signal received as input from uplink signal radio section 211 to variable attenuator 206.

Downlink signal radio section 208 amplifies the pilot signal and downlink signal received as input from duplexer 207 and outputs the signals to distributor 209.

Distributor 209 divides the pilot signal and downlink signal received as input from downlink signal radio section 208 into two sequences, outputs one of the two sequences of the pilot signal and downlink signal to duplexer 210 and outputs the other sequence to pilot detection section 215.

Duplexer 210 outputs the pilot signal and downlink signal received as input from distributor 209 to distributor 212 and also outputs an uplink signal received as input from distributor 212 to uplink signal radio section 211.

Uplink signal radio section 211 amplifies the uplink signal received as input from duplexer 210 and outputs the uplink signal to duplexer 207.

Distributor 212 divides the pilot signal and downlink signal received as input from duplexer 210 into two sequences, outputs one of the two sequences of the pilot signal and the downlink signal to switching section 213 and outputs the other sequence to slave unit 105. Furthermore, distributor 212 outputs an uplink signal received as input from switching section 213 to duplexer 210. Furthermore, distributor 212 is supplied power from DC/DC 218 and then supplies the supplied power to the subsequent slave unit.

In the operation mode, switching section 213, which is a transmission control means, outputs the downlink signal received as input from distributor 212 to antenna 214 under the control of control section 216 (described later), and also outputs an uplink signal received as input from antenna 214 to distributor 212. Furthermore, in the measurement mode, switching section 213 prevents a pilot signal received as input from distributor 212 from being outputted to antenna 214.

Antenna 214 transmits the downlink signal received as input from switching section 213 to a communication terminal apparatus (not shown). Furthermore, antenna 214 receives an uplink signal transmitted from the communication terminal apparatus and outputs the received uplink signal to switching section 213.

Pilot detection section 215, which is a reception level detection means, detects the reception levels of the pilot signal and downlink signal received as input from distributor 209 and outputs reception level information, which is information about the detected reception level, to control section 216.

When deciding whether or not a pilot signal has been received, control section 216, which is a pilot signal reception deciding means and a gain adjusting means, decides whether or not a pilot signal has been received based on the reception level information received as input from pilot detection section 215. Upon detecting a signal of a specific pattern, control section 216 decides that a pilot signal has been received. Upon deciding that a pilot signal has been received, control section 216 sets attenuation factors that match the cable loss, which is the amplitude loss in coaxial cable 112, based on the reception level information received as input from pilot detection section 215, and controls variable attenuator 206 for attenuation at the set attenuation factors. Furthermore, control section 216 controls switching section 213 not to output the pilot signal received as input from distributor 212 to antenna 214 immediately after power is turned on. Furthermore, when a predetermined time passes after having started the setting of attenuation factors, control section 216 controls LED 217 to inform that the measurement mode has finished. Furthermore, in addition to the attenuation factors that match the cable loss, control section 216 of slave unit 107 to 110 sets attenuation factors that match the distribution loss, which is the amplitude loss produced when distributor 111 distributes a downlink signal, and controls variable attenuator 206 for attenuation at the set attenuation factors. The detailed configuration of control section 216 will be described later.

LED 217 emits light under the control of control section 216 and informs the outside by emitting light that the measurement mode has finished.

DC/DC 218 supplies the power supplied from power control section 202 of relay apparatus adapter 103 as the power for slave unit 104. Furthermore, the power of DC/DC 218 is turned off when power control section 202 of relay apparatus adapter 103 turns off the power and the power of DC/DC 218 is turned on when power control section 202 of relay apparatus adapter 103 turns on the power.

Figure 3:
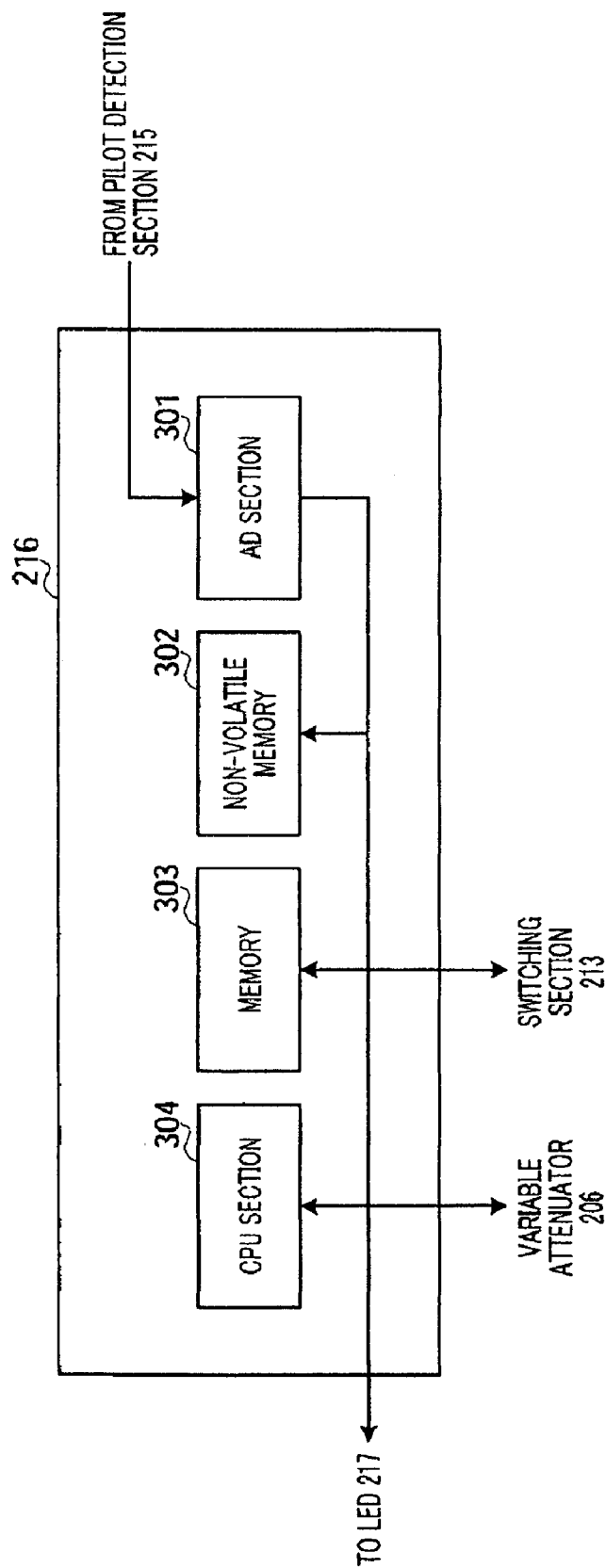
FIG. 3 shows a configuration of the control section according to Embodiment 1 of the present invention.

Next, the detailed configuration of control section 216 will be explained using FIG. 3. FIG. 3 shows the configuration of control section 216.

AD section 301 converts the reception level from an analog value to a digital value based on the reception level information received as input from pilot detection section 215, sequentially writes the converted digital values to memory 303 and also outputs the digital values to CPU section 304.

Non-volatile memory 302 stores the attenuation factors set in variable attenuator 206 by CPU section 304 (described later).

Memory 303 sequentially stores the digital values written from AD section 301. Furthermore, memory 303 stores reference values used when setting attenuation factors.

In cooperation with AD section 301 and memory 303, CPU section 304 decides whether or not a pilot signal has been received. Furthermore, CPU section 304 compares the digital values stored in memory 303 with digital values of specific patterns, which provides the basis for the decision, decides whether or not the compared values match, and thereby decides whether or not the pilot signal has been received. Upon deciding that the pilot signal has been received, CPU section 304 sets attenuation factors based on the reception level information about the pilot signal acquired from AD section 301 and the reference values acquired from memory 303, and controls variable attenuator 206 for attenuation at the set attenuation factors. Furthermore, immediately after power is turned on, CPU section 304 controls switching section 213 not to output the signal received as input from distributor 212 to antenna 214. Furthermore, when the setting of attenuation factors is finished, CPU section 304 controls LED 217 to inform that the measurement mode has finished.

Next, the operations of relay apparatus adapter 103 and slave unit 104 of extension slave unit system 120 will be explained. The operations of relay apparatus adapter 103 will be explained first, and then the operations of slave unit 104 will be explained.

Figure 4:
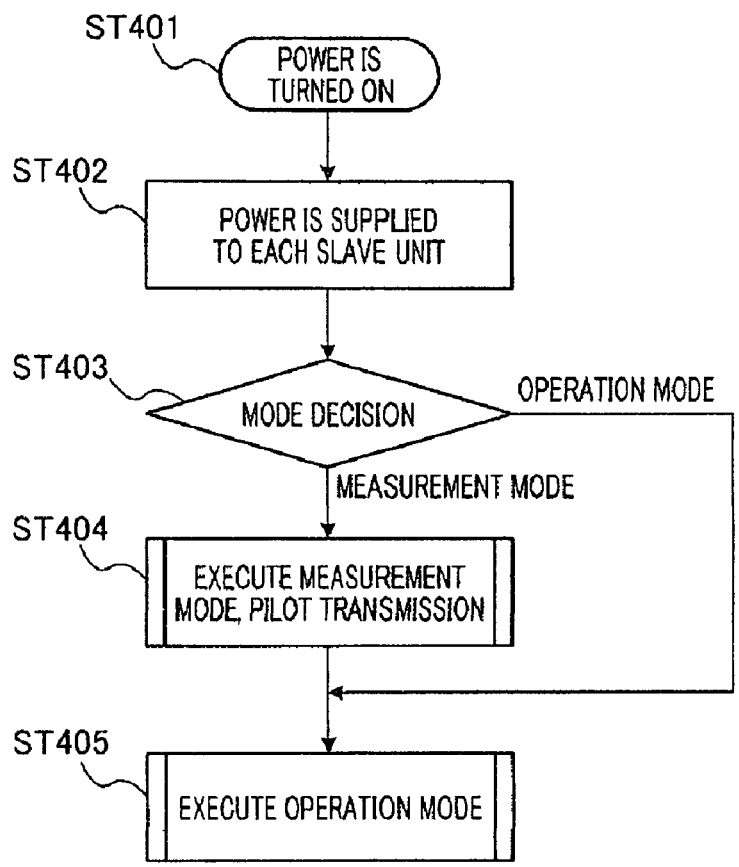
FIG. 4 is a flowchart showing the operations of the relay apparatus adapter according to Embodiment 1 of the present invention.

FIG. 4 is a flowchart showing the operations of relay apparatus adapter 103.

Power control section 202 of relay apparatus adapter 103 powers on (step ST 401). Furthermore, power control section 202 supplies power to slave units 104 to 110 (step ST 402).

Next, master unit control section 201 of relay apparatus adapter 103 identifies the mode in accordance with switches in switching section 205 (step ST 403).

In step ST 403, upon identifying the measurement mode, master unit control section 201 executes the measurement mode (step ST 404). The operations of relay apparatus adapter 103 and slave unit 104 in the measurement mode will be described later.

On the other hand, in step ST 403, upon identifying the operation mode, master unit control section 201 executes the operation mode (step ST 405).

Figure 5:
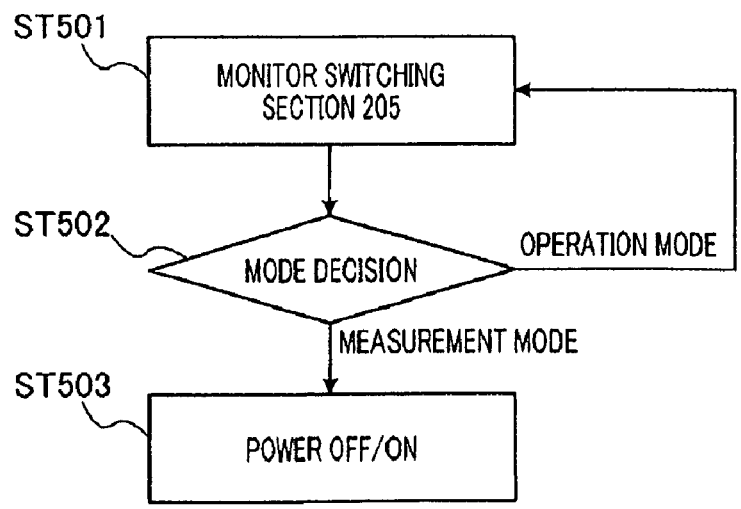
FIG. 5 is a flowchart showing the operations of the operation mode according to Embodiment 1 of the present invention.

Next, the details of the operations of relay apparatus adapter 103 in the operation mode and measurement mode will be explained in detail. FIG. 5 is a flowchart showing operations in the operation mode.

In the operation mode, master unit control section 201 always monitors switching section 205 (step ST 501) and identifies the mode (step ST 502).

When the operation mode is identified in step ST 502, master unit control section 201 controls switching section 205 not to output the pilot signal generated in pilot signal generation section 203 and to output the downlink signal received as input from relay apparatus 102 to variable attenuator 206 of slave unit 104. Furthermore, master unit control section 201 continues monitoring switching section 205 (step ST 501).

On the other hand, in the case where the operation mode changes to the measurement mode in the decision in step ST 502, power control section 202 performs power control such that the supply of power to the slave unit side is turned off and then turned on again (step ST 503).

Figure 6:
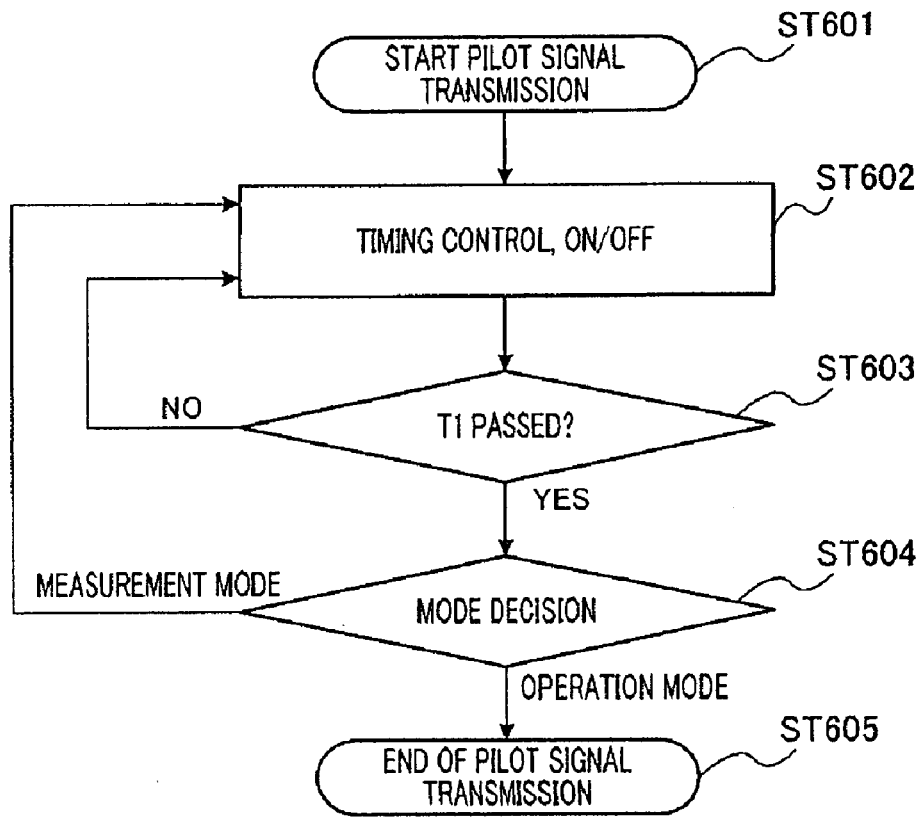
FIG. 6 is a flowchart showing the operations of the measurement mode according to Embodiment 1 of the present invention.
Figure 7:
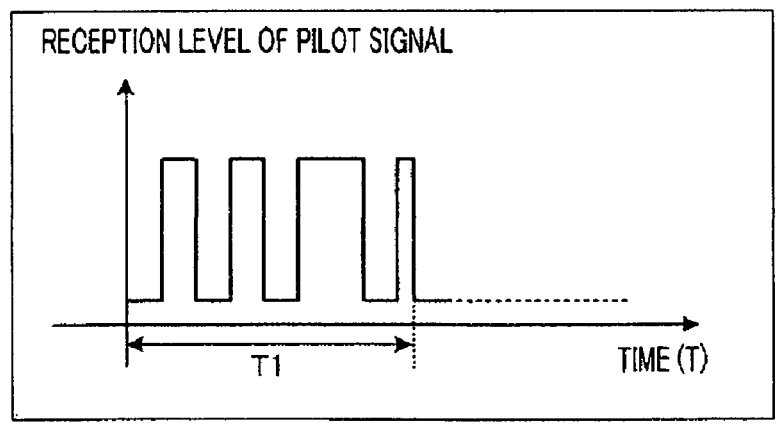
FIG. 7 shows a pilot signal according to Embodiment 1 of the present invention.

Next, the operations of relay apparatus adapter 103 in the measurement mode will be explained using FIG. 6 and FIG. 7. FIG. 6 is a flowchart showing operations in the measurement mode and FIG. 7 shows a pilot signal.

In the measurement mode, relay apparatus adapter 103 outputs a pilot signal generated by pilot signal generation section 203 under the control of master unit control section 201. This causes relay apparatus adapter 103 to start transmission of the pilot signal (step ST 601).

Next, master unit control section 201 performs control using switching section 204, thereby transmitting a pilot signal of a specific pattern (step ST 602).

Next, master unit control section 201 decides whether or not time T1 has passed after the transmission of the pilot signal started (step ST 603).

When time T 1 has not passed, the processing in step ST 602 is repeated until time T1 passes. On the other hand, when time T1 has passed, master unit control section 201 identifies the mode (step ST 604).

When the mode decision result identifies the measurement mode, the processing in step ST 602 to step ST 604 is repeated, and, when the result identifies the operation mode, the transmission of the pilot signal is finished (step ST 605).

As shown in FIG. 7, the pilot signal is a signal having a specific pattern in predetermined time T1. The pilot signal transmitted from pilot signal generation section 203 is generated by repeating turning on and off the power in switching section 204. Furthermore, the pilot signal repeats being transmitted while switching section 205 is in the measurement mode.

Next, the operations of slave unit 104 in extension slave unit system 120 will be explained.

Figure 8:
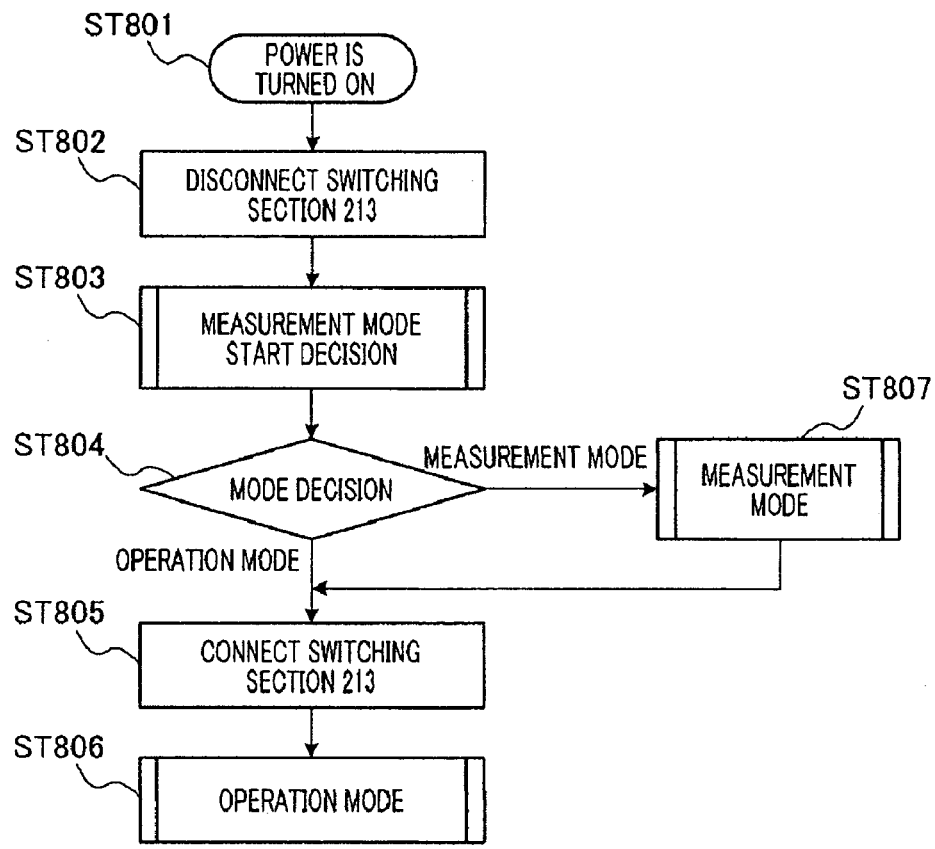
FIG. 8 is a flowchart showing the operations of the slave unit according to Embodiment 1 of the present invention.

FIG. 8 is a flowchart showing the operations of slave unit 104.

DC/DC 218 of slave unit 104 powers on upon receiving a supply of power from relay apparatus adapter 103 (step ST 801).

Next, switching section 213 of slave unit 104 cuts the connection between distributor 212 and antenna 214, such that the signal received as input is not outputted to antenna 214 (step ST 802). Upon starting power, switching section 213 is always set to cut the connection between distributor 212 and antenna 214.

Next, control section 216 of slave unit 104 performs the processing for deciding whether or not to start the measurement mode (step ST 803). The method of deciding whether or not to start the measurement mode will be described later.

Next, control section 216 identifies the mode based on the processing result in step ST 803 (step ST 804).

When the decision result in step ST 804 identifies the operation mode, switching section 213 connects distributor 212 and antenna 214 under the control of control section 216 (step ST 805). Slave unit 104 then executes the operation mode (step ST 806).

In the operation mode, control section 216 of slave unit 104 fixes the attenuation factors in variable attenuator 206 and controls variable attenuator 206 for attenuation at the same attenuation factor until power is turned off.

On the other hand, the decision result in step ST 804 identifies the measurement mode, slave unit 104 executes the measurement mode (step ST 807). After the measurement mode is finished, switching section 213 connects distributor 212 and antenna 214 under the control of control section 216 (step ST 805). Operations in the measurement mode will be described later.

Figure 9:
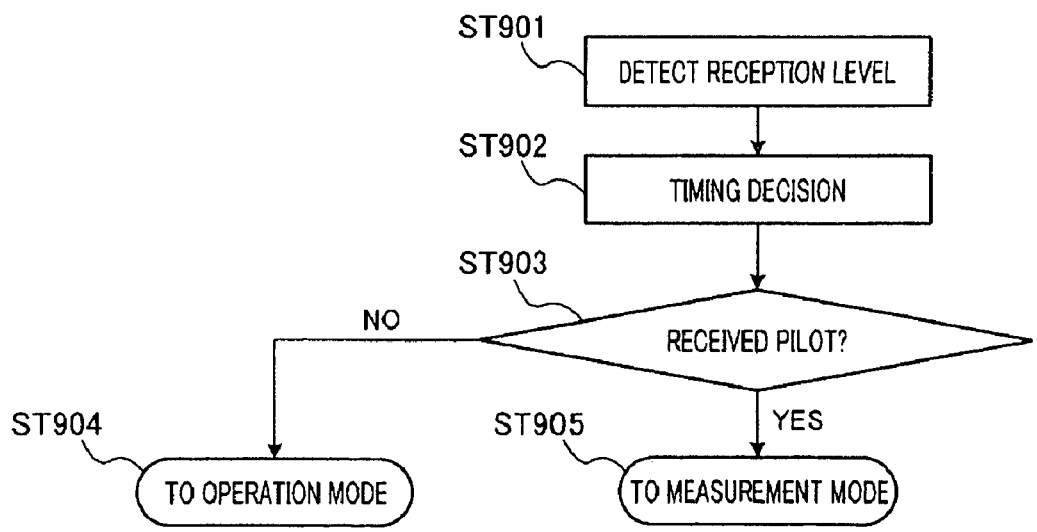
FIG. 9 is a flowchart showing a method of deciding whether or not to start the measurement mode according to Embodiment 1 of the present invention.

Next, the method of deciding whether or not to start the measurement mode in step ST 803 of FIG. 8 will be explained using FIG. 9. FIG. 9 is a flowchart showing a method of deciding whether or not to start the measurement mode.

In the decision as to whether or not to start the measurement mode, pilot detection section 215 first starts deciding whether or not to start the measurement mode when the supply of power from DC/DC 218 changes from "OFF" to "ON," and then detects the reception level of the signal received as input (step ST 901). Control section 216 then decides timing of the signal received as input based on the detected reception level (step ST 902). The timing decision method will be described later.

Next, control section 216 decides whether or not a pilot signal has been received based on the timing decision result (step ST 903).

Upon deciding that a pilot signal has not been received, control section 216 then executes the operation mode (step ST 904) or executes the measurement mode upon deciding that the pilot signal has been received (step ST 905).

Figure 10:
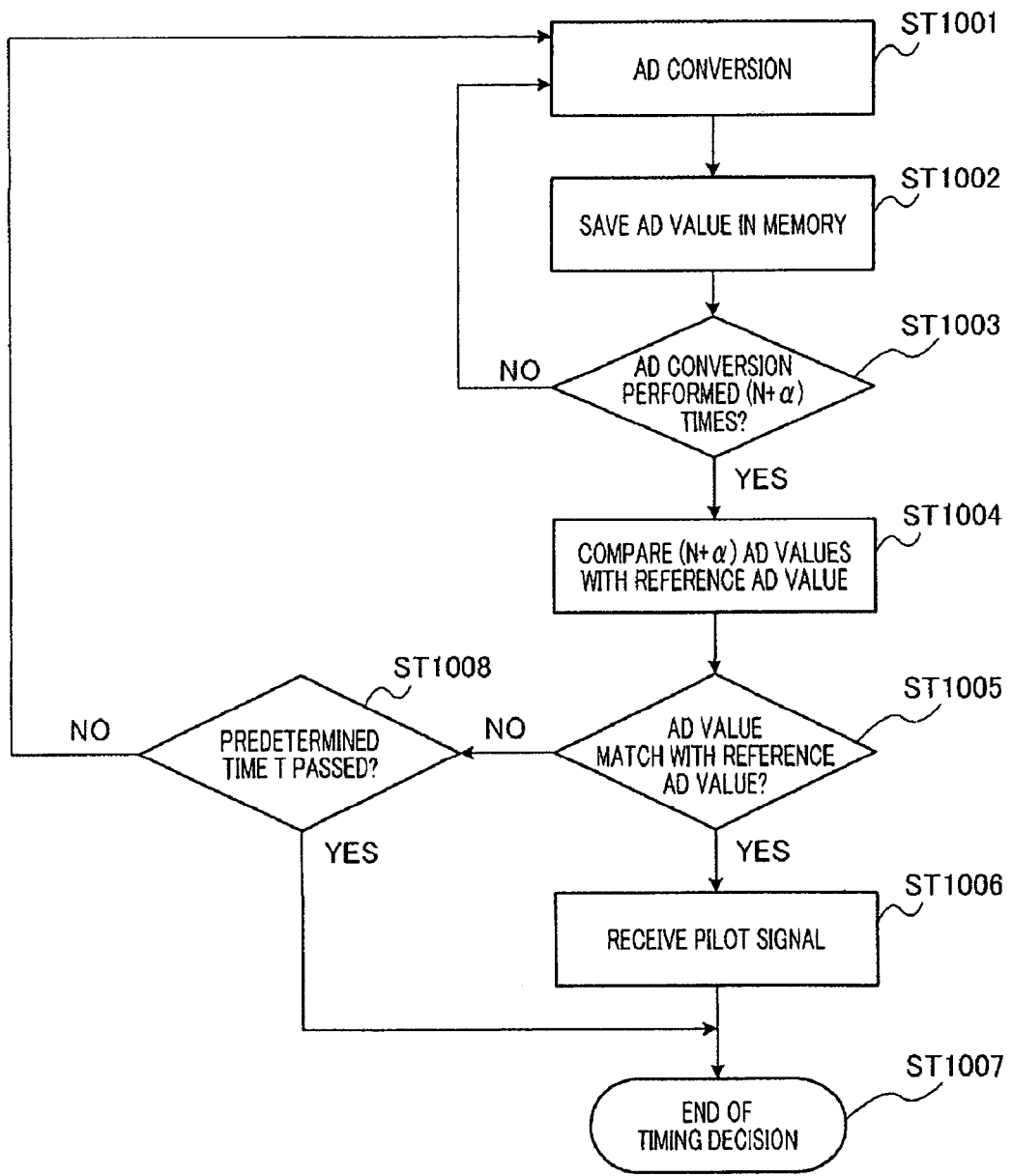
FIG. 10 is a flowchart showing a timing decision method according to Embodiment 1 of the present invention.

Next, the method of deciding timing in step ST 902 of FIG. 9 will be explained using FIG. 10. FIG. 10 is a flowchart showing the method of deciding timing.

AD section 301 of control section 216 performs analog/digital (hereinafter "AD") conversion according to the detected reception level on the signal detected by pilot detection section 215 (step ST 1001). AD section 301 then saves the N-th (where N is an arbitrary natural number) AD-converted digital value (hereinafter "AD value") detected by the AD conversion, in memory 303 of control section 216 (step ST 1002).

FIG. 11A to FIG. 11E show memory 303. The upper row of memory 303 is an area for saving the AD values detected in AD section 301 and the lower row of memory 303 is an area for saving the reference AD values in advance. As shown in FIG. 11A, memory 303 saves reference AD values "1010" in advance. AD section 301 saves the N-th AD value "1" in leftmost first column #1101 in the upper row of memory 303.

Next, CPU section 304 of control section 216 decides whether or not AD conversion has been performed predetermined (N+α) times (where a is an integer equal to or greater than 0) (step ST 1003).

When AD conversion has not been performed (N+α) times in step ST 1003, CPU section 304 commands AD section 301 to perform AD conversion, and AD section 301 performs AD conversion (step ST 1001). AD section 301 then saves the (N+1)-th AD value detected by the AD conversion in memory 303 of control section 216 (step ST 1002).

As shown in FIG. 11C, AD section 301 saves the (N+1)-th AD value "0" in second column #1102 from the left on the upper row of memory 303.

Thus, by repeating the processing from step ST 1001 to step ST 1003, AD section 301 saves the (N+α−1)-th AD value "1" in second column #1103 from the right on the upper row of memory 303 and also saves the (N+α)-th AD value "0" in rightmost #1104 as shown in FIG. 11D.

CPU section 304 then decides whether or not AD conversion has been performed (N+α) times (step ST 1003), and, if AD conversion has been performed (N+α) times, compares the (N+α) AD values subjected to the AD conversion with the reference AD values (step ST 1004).

Next, as a result of the comparison in step ST 1004, CPU section 304 decides whether or not the AD values saved in memory 303 match with the reference AD values (step ST 1005).

When the AD values match with the reference AD values, that is, in the case of FIG. 11E, CPU section 304 decides that the pilot signal has been received (step ST 1006) and finishes the timing decision (step ST 1007).

On the other hand, when the AD values do not match with the reference AD values in step ST 1005, CPU section 304 decides whether or not a predetermined constant time T has passed (step ST 1008).

In step ST 1008, upon deciding that the predetermined time T has passed, CPU section 304 finishes the timing decision (step ST 1007) or repeats the processing in step ST 1001 to step ST 1008 upon deciding that the predetermined time T has not passed.

FIG. 12 and FIG. 13 show a method of comparing AD values with reference AD values. In FIG. 12 and FIG. 13, the vertical axis shows the reception level after digital conversion, and the horizontal axis shows time. Furthermore, the vertical axis in FIG. 12A and FIG. 13A shows an actually measured value of the reception level and the vertical axis in FIG. 12B and FIG. 13B shows a default value of the reception level. FIG. 12 shows a case where AD values match with reference AD values and FIG. 13 shows a case where AD values do not match with reference AD values.

As shown in FIG. 12, when the pattern of the transition of reception level over time detected by pilot detection section 215 (i.e. the pattern of FIG. 12A) matches with a known pattern (i.e. the pattern of FIG. 12B), CPU section 304 decides that a pilot signal has been received. On the other hand, as shown in FIG. 13, when the pattern of the transition of reception level over time detected by pilot detection section 215 (e.g. the pattern in FIG. 13A) does not match with a known pattern (e.g. the pattern in FIG. 13B), CPU section 304 decides that a pilot signal has not been received.

Figure 14:
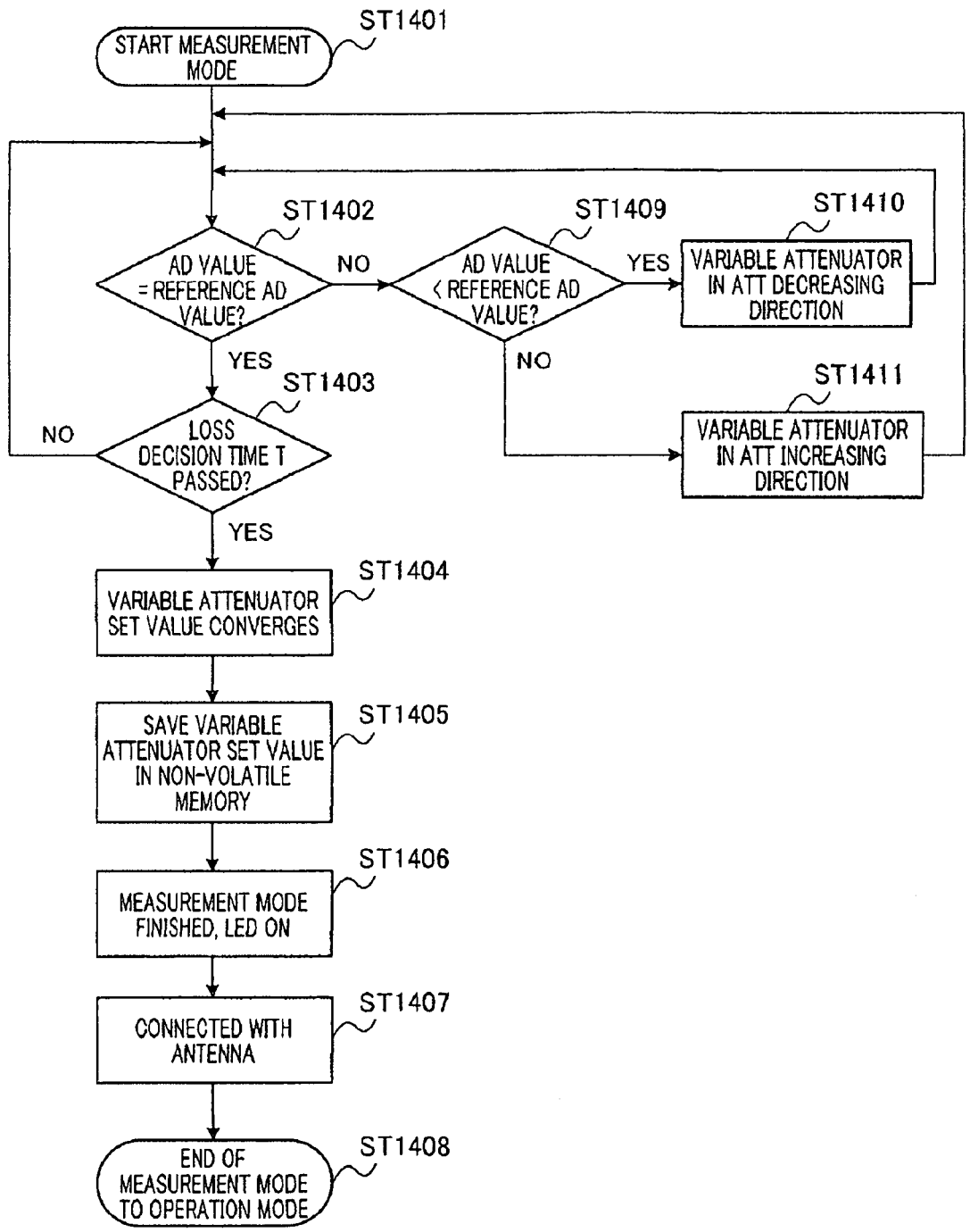
FIG. 14 is a flowchart showing operations in the measurement mode according to Embodiment 1 of the present invention.

Next, the operations of slave unit 104 in the measurement mode in step ST 807 of FIG. 8 will be explained using FIG. 14. FIG. 14 is a flowchart showing operations in the measurement mode.

Upon starting the measurement mode (step ST 1401), CPU section 304 of control section 216 decides whether or not the AD values, which are the reception level information acquired from AD section 301, match with the reference AD values, which are the reference values acquired from memory 303 (i.e. AD values=reference AD values) (step ST 1402).

When the detected AD values match with the reference AD values, CPU section 304 decides whether or not the cable loss decision time T has passed (step ST 1403).

When, for example, slave unit 105 and slave unit 106 are cascaded to slave unit 104 as shown in FIG. 1, control section 216 of each slave unit 104 to 106 sets attenuation factors in variable attenuator 206 in order of slave unit 104, slave unit 105 and slave unit 106, and also sets the time slave unit 104 starts setting up attenuation factors until the setting of attenuation factors in slave unit 106 is finished, as the cable loss decision time T. Similar cable loss decision times T are also set for slave unit 107, slave unit 108, slave unit 109 and slave unit 110.

In the case where the cable loss decision time T has passed, CPU section 304 causes the set value of the attenuation factors in variable attenuator 206 to converge (step ST 1404).

Next, CPU section 304 saves the converged set values of the latest attenuation factors in variable attenuator 206 in non-volatile memory 302 (step ST 1405).

Next, CPU section 304 controls LED 217 to light up in order to inform that the measurement mode has been finished (step ST 1406).

Next, switching section 213 performs switching so as to connect distributor 212 and antenna 214 under the control of CPU section 304 (step ST 1407).

Next, slave unit 104 finishes the measurement mode and transitions to the operation mode (step ST 1408).

On the other hand, in step ST 1402, when the detected AD values do not match with the reference AD values, it is decided whether or not the detected AD values are smaller than the reference AD values (i.e. AD values<reference AD values) (step ST 1409).

When the detected AD values are smaller than the reference AD values, CPU section 304 sets attenuation factors (i.e. adjustment values) that reduce the amount of attenuation (ATT) of variable attenuator 206 (step ST 1410), and, when the detected AD values are not smaller than the reference AD values, the detected AD values are greater than the reference AD values, and therefore CPU section 304 sets attenuation factors that cause the amount of attenuation of variable attenuator 206 to increase (step ST 1411).

Furthermore, when the cable loss decision time T has not passed in step ST 1403, step ST 1402, step ST 1403 and steps ST 1409 to ST 1411 are repeated. In this way, CPU section 304 adjusts the amount of attenuation of variable attenuator 206 such that the AD values match with the reference AD values, and variable attenuator 206 adjusts the gains of an uplink signal and downlink signal.

In FIG. 14, the amount of attenuation is adjusted gradually, but the present invention is not limited to this, and control section 216 may adjust gain by storing gain adjustment information that associates reception levels and attenuation factors in advance, select attenuation factors with reference to the gain adjustment information using the reception level as received from pilot detection section 215 and control variable attenuator 206 to attenuate an uplink signal and downlink signal at the selected attenuation factors.

By the way, in the relay apparatus of the mobile communication according to Document 1, which is a conventional mobile communication relay apparatus, variable gain amplifier 12 of each antenna module 6-1 to n is connected via couplers C1, C2, . . . , Cn. That is, in the mobile communication relay apparatus according to Patent Document 1, variable gain amplifier 12 of each antenna module 6-1 to n is provided after couplers C1, C2, . . . , Cn. On the other hand, in slave unit 104 according to present Embodiment 1, as shown in FIG. 2, variable attenuator 206 of slave unit 104 is provided before distributor 212 (on the left side of distributor 212). Therefore, in the mobile communication relay apparatus according to Patent Document 1, the cable length from coupler C1 to variable gain amplifier 12, of each antenna module 6-1 to n where cable loss occurs varies for each antenna module 6-1 to n, and the more rearward an antenna module is located, the more cable loss is accumulated, and, therefore, the more rearward antenna module 6-1 to n is located, the more difficult it is to adjust gain accurately. On the other hand, present Embodiment 1 prevents accumulation of cable loss in coaxial cables 112 to 118 in the slave units connected rearward by adopting the configuration in FIG. 2, thereby making it possible to adjust gain at each slave unit 104 to 110 in the system with substantially the same set values and therefore build a system with a plurality of slave units of the same characteristics.

As such, according to present Embodiment 1, the cable loss produced up till arrival at each slave unit can be corrected by adjusting gain using pilot signals. Furthermore, according to present Embodiment 1, the output levels from the antennas of individual slave units can be maintained substantially uniform. Furthermore, present Embodiment 1 cuts the connection between distributor 212 and antenna 214 to prevent a pilot signal from being transmitted from antenna 214, thereby canceling interference against the communication terminal apparatus. Furthermore, according to present Embodiment 1, when transmission of a pilot signal is started, the slave units are always placed in the condition immediately after power is turned on, so that it is possible to avoid misidentifying between a pilot signal, uplink signal and downlink signal. Furthermore, present Embodiment 1 continues adjusting gain until gain adjustment is finished for all of serially connected slave units, thereby enabling optimal gain adjustment for all of serially-connected slave units. Furthermore, present Embodiment 1 stores the values of the attenuation factors set in non-volatile memory 302, so that it is possible to continue using values that have been set once, even if power is turned off unexpectedly because of power failure and so on. Furthermore, present Embodiment 1 can correct the loss produced upon distribution in distributor 111 (i.e. distribution loss) together with the cable loss.

Embodiment 2

Figure 15:
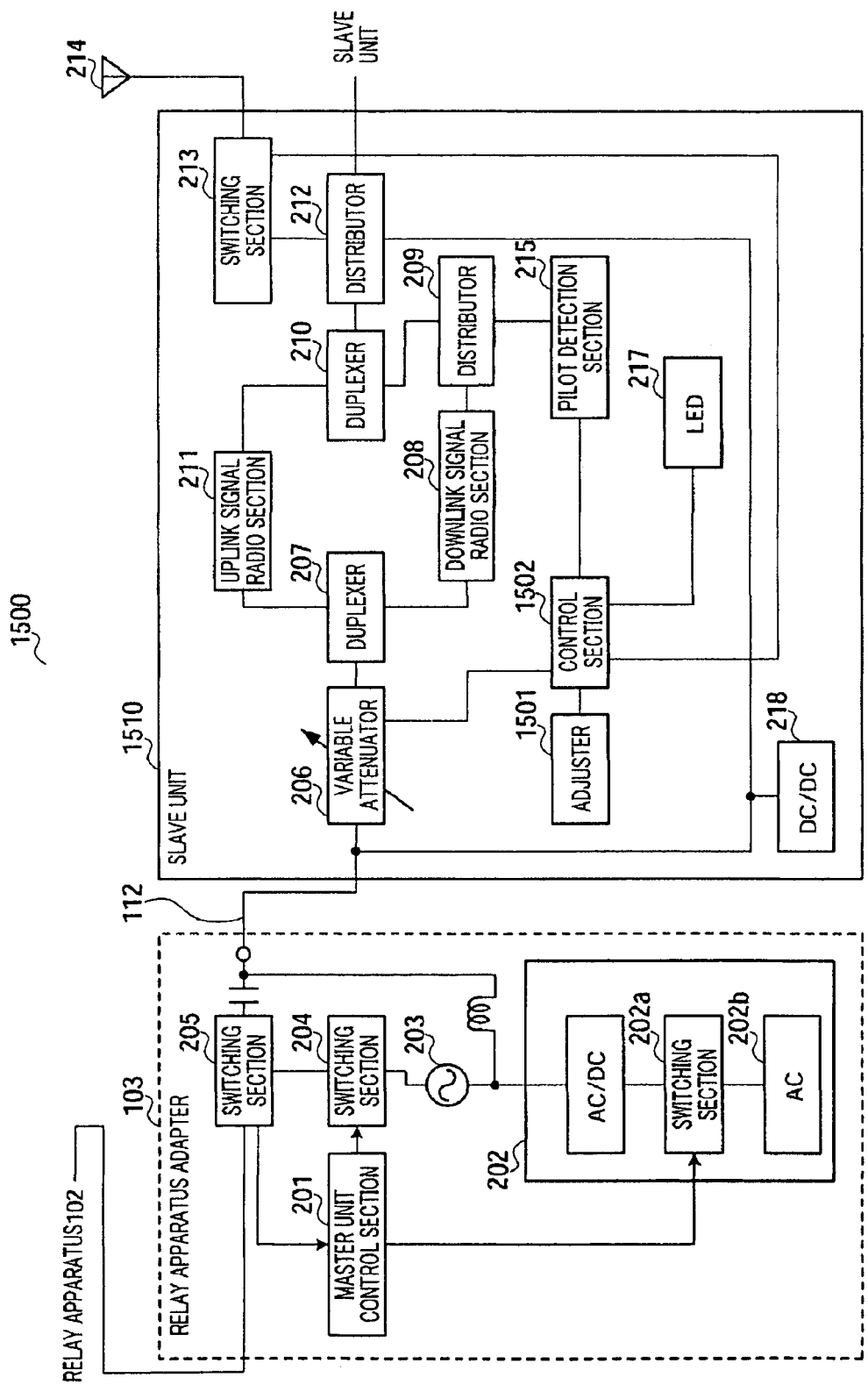
FIG. 15 shows an extension slave unit system according to Embodiment 2 of the present invention.

FIG. 15 is a block diagram showing a configuration of extension slave unit system 1500 according to Embodiment 2 of the present invention. Relay apparatus adapter 103 and slave unit 1510 (extension slave unit apparatus) constitute extension slave unit system 1500.

Extension slave unit system 1500 according to present Embodiment 2 adds adjuster 1501 to extension slave unit system 120 according to Embodiment 1 shown in FIG. 2 and includes control section 1502 instead of control section 216 as shown in FIG. 15. In FIG. 15, the same configurations and parts as those in FIG. 2 will be assigned the same reference numerals and their explanations will be omitted. Furthermore, the extension system according to present Embodiment 2 is the same as extension system 100 in FIG. 1 except that slave unit 1510 is provided instead of slave unit 104 to 110 in FIG. 1, and therefore their explanations will be omitted.

Adjuster 1501 allows the measurement mode and operation mode to be, for example, set manually at arbitrary timing. Furthermore, after slave unit 1510 is powered on, adjuster 1501 reports to control section 1502 whether the mode is the measurement mode or the operation mode.

Upon receiving a report from adjuster 1501 that the measurement mode is set, control section 1502 sets attenuation factors that match the cable loss, which is the amplitude loss in coaxial cable 112, based on reception level information received as input from pilot detection section 215 and controls variable attenuator 206 for attenuation at the set attenuation factors. Furthermore, immediately after power is turned on, control section 1502 controls switching section 213 not to output a pilot signal received as input from distributor 212 to antenna 214. Furthermore, control section 1502 maintains the setup of attenuation factors until the setting in adjuster 1501 shows that the measurement is finished. Furthermore, control section 1502 controls LED 217 to inform that the measurement mode has finished. Details of the configuration of control section 1502 will be described later.

Variable attenuator 206 attenuates a pilot signal and downlink signal received as input from switching section 205 of relay apparatus adapter 103 via coaxial cable 112 and an uplink signal received as input from duplexer 207 at the attenuation factors set in control section 1502 and thereby adjusts gain. Variable attenuator 206 then outputs the attenuated pilot signal and downlink signal to duplexer 207 and also outputs the attenuated uplink signal to switching section 205 of relay apparatus adapter 103 via coaxial cable 112. Furthermore, variable attenuator 206 can fix or make variable the attenuation factors.

Figure 16:
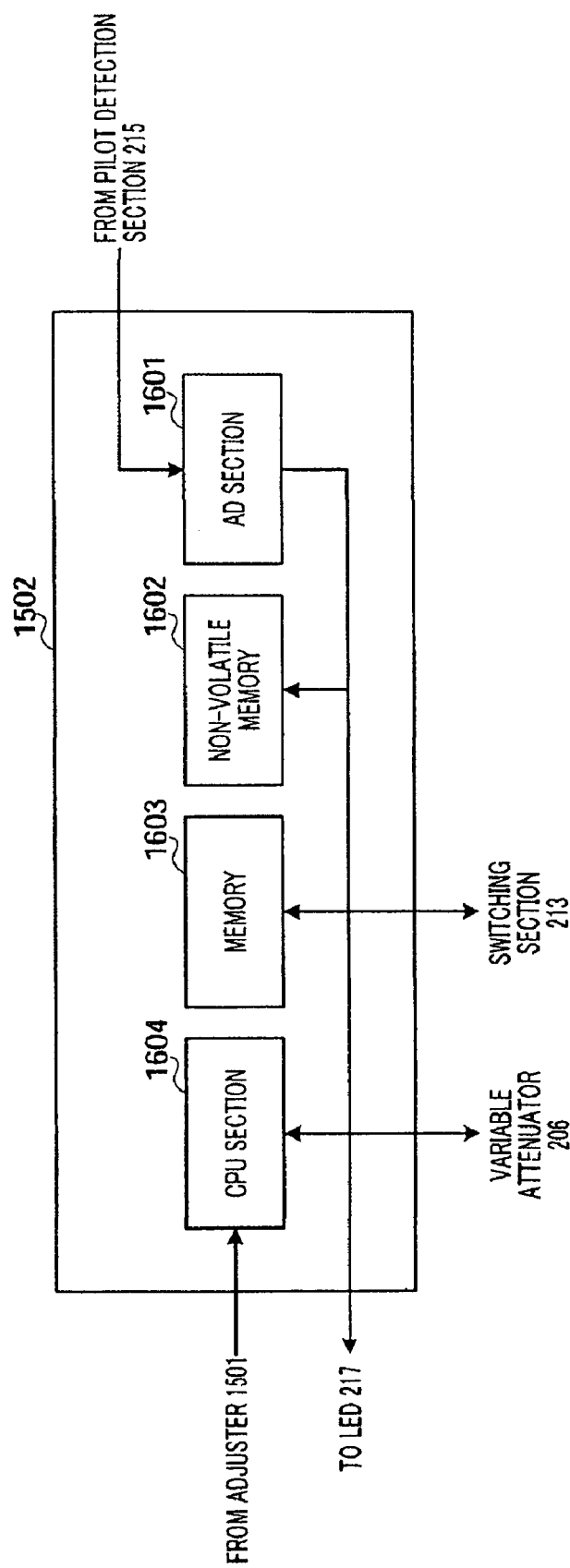
FIG. 16 shows a configuration of the control section according to Embodiment 2 of the present invention.

Next, a detailed configuration of control section 1502 will be explained using FIG. 16. FIG. 16 shows a configuration of control section 1502.

AD section 1601 converts the reception level from an analog value to a digital value based on reception level information received as input from adjuster pilot detection section 215 and outputs the converted digital value to memory 1603 and CPU section 1604.

Memory 1603 stores the reference values used when setting attenuation factors.

Non-volatile memory 1602 stores the attenuation factors in variable attenuator 206 set by CPU section 1604.

Upon receiving a report from adjuster 1501 that the measurement mode is set up, CPU section 1604 sets attenuation factors based on reception level information about a pilot signal acquired from AD section 1601 and a reference value acquired from memory 1603 and controls variable attenuator 206 for attenuation at the set attenuation factors. Furthermore, immediately after power is turned on, CPU section 1604 controls switching section 213 not to output a signal received as input from distributor 212 to antenna 214. Furthermore, when the setting of attenuation factors is finished, CPU section 1604 controls LED 217 to inform that the measurement mode has finished.

Figure 17:
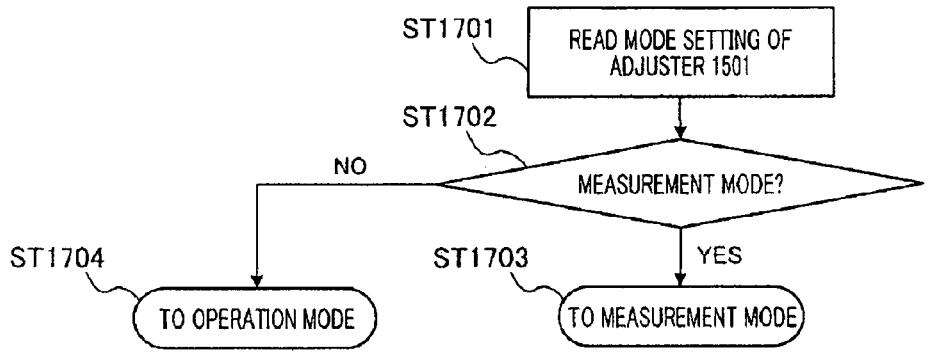
FIG. 17 is a flowchart showing a method of identifying the measurement mode according to Embodiment 2 of the present invention.

Next, a method of deciding whether or not to start the measurement mode in slave unit 1510 will be explained using FIG. 17. FIG. 17 is a flowchart showing the method of deciding whether or not to start the measurement mode. The operations of relay apparatus adapter 103 according to present Embodiment 2 are the same as in FIG. 4 to FIG. 7, and therefore their explanations will be omitted.

Control section 1502 reads the mode set in adjuster 1501 from adjuster 1501 (step ST 1701).

Next, control section 1502 decides whether the mode is the measurement mode or operation mode (step ST 1702).

When the decision result identifies the measurement mode, control section 1502 performs control in the measurement mode (step ST 1703). Oil the other hand, when the mode is not the measurement mode, that is, when the mode is the operation mode, control section 1502 performs control in the operation mode until power is turned off (step ST 1704). The correction of cable loss is continued, for example, until adjuster 1501 is switched to the setting showing the measurement mode has finished.

Figure 18:
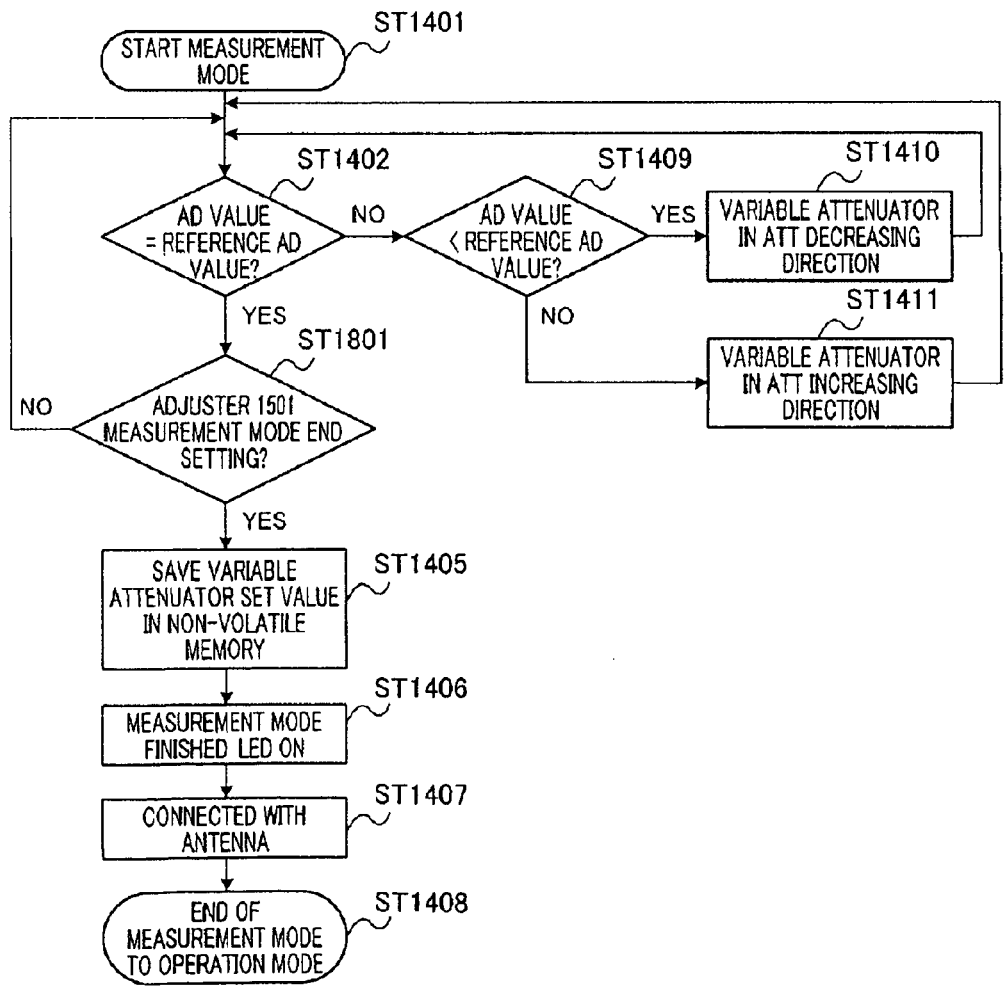
FIG. 18 is a flowchart showing operations in the measurement mode according to Embodiment 2 of the present invention.

Next, the operations of slave unit 104 in the measurement mode in step ST 1703 of FIG. 17 will be explained using FIG. 18. FIG. 18 is a flowchart showing operations in the measurement mode. In FIG. 18, parts of the same operations as those in FIG. 14 will be assigned the same reference numerals and their explanations will be omitted.

Upon starting the measurement mode (step ST 1401), CPU section 1604 of control section 1502 decides whether or not the AD values, which are reception level information acquired from AD section 1601, match with reference AD values, which is a reference value acquired from memory 1603 (i.e. AD values=reference AD values) (step ST 1402).

When the detected AD values match with the reference AD values, control section 1502 decides whether or not adjuster 1501 assumes the setting showing the measurement mode has finished (step ST 1801).

When adjuster 1501 assumes the setup showing that the measurement mode is finished, CPU section 1604 saves the values of the latest attenuation factors set in non-volatile memory 1602 (step ST 1405).

Thus, present Embodiment 2 adjusts gain using a pilot signal, thereby making it possible to correct the cable loss produced up till arrival at each slave unit and maintain the output levels from the antennas of individual slave units substantially uniform. Furthermore, present Embodiment 2 cuts the connection between distributor 212 and antenna 214 to prevent a pilot signal from being transmitted from antenna 214, thereby canceling interference against the communication terminal apparatus. Furthermore, present Embodiment 2 stores the values of the attenuation factors set in non-volatile memory 1602, so that it is possible to continue using values that have been set once, even if power is turned off unexpectedly because of power failure and so on. Furthermore, present Embodiment 2 can set the measurement mode and the operation mode at arbitrary timing, so that it is not necessary to decide whether or not a pilot signal has been received and it is possible to reduce the processing load upon slave unit 1510 and avoid misjudging that a pilot signal has been received. Furthermore, present Embodiment 2 can correct loss produced upon distribution in distributor 111 (i.e. distribution loss) with the cable loss at the same time.

Embodiment 3

Figure 19:
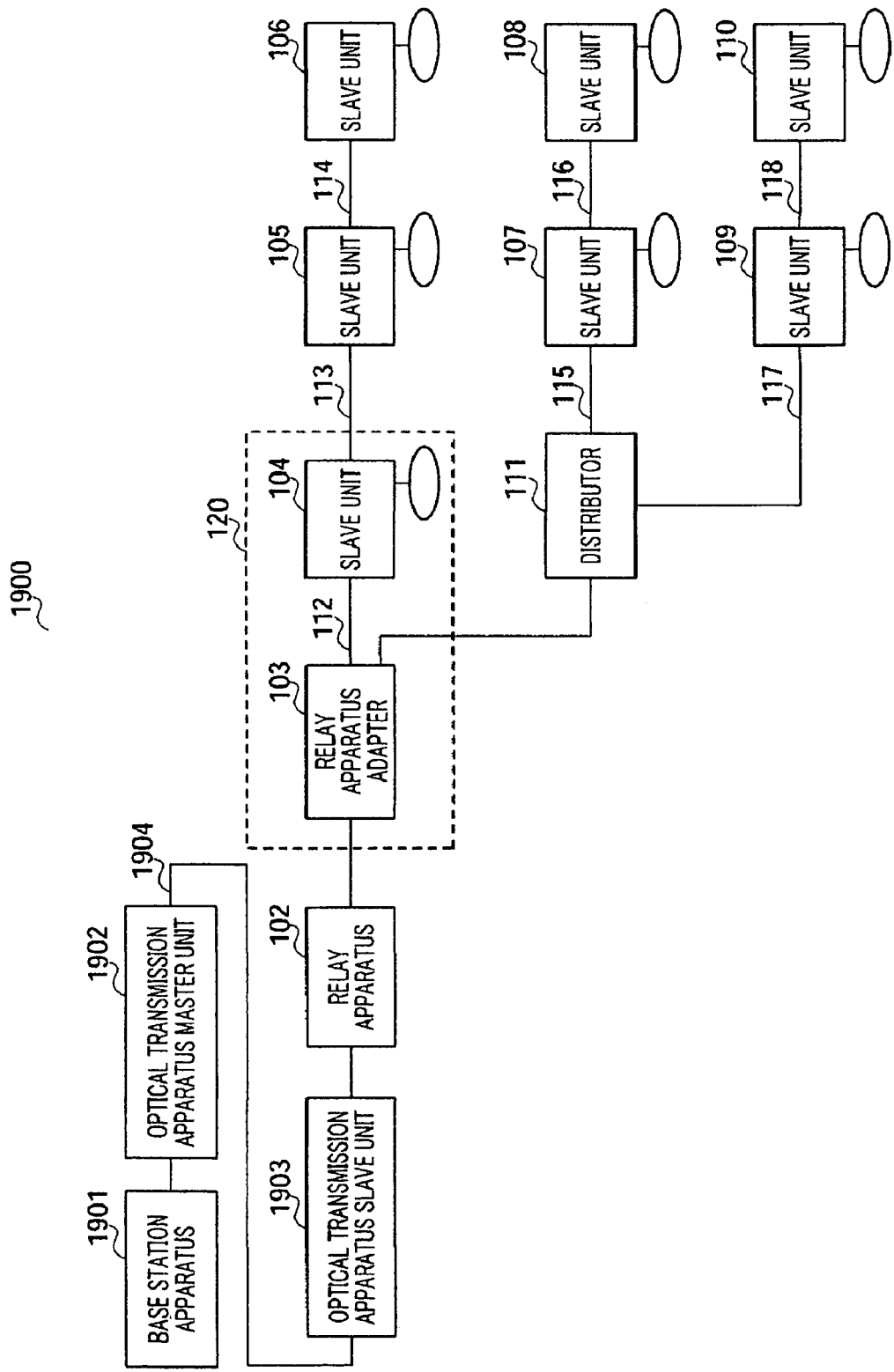
FIG. 19 shows an extension system according to Embodiment 3 of the present invention.

FIG. 19 shows a configuration of extension system 1900 according to Embodiment 3 of the present invention.

Extension system 1900 according to present Embodiment 3 removes antenna 101 from extension system 100 according to Embodiment 1 shown in FIG. 1 and adds base station apparatus 1901, optical transmission apparatus (master unit E/O) 1902 and optical transmission apparatus (slave unit O/E) 1903 as shown in FIG. 19. In FIG. 19, parts having the same configurations as those in FIG. 1 will be assigned the same reference numerals and their explanations will be omitted.

FIG. 19 is a configuration diagram when communication between relay apparatus 102 and base station apparatus according to Embodiment 1 is carried out not only by radio but also using optical cable 1904. In the configuration, optical transmission apparatus master unit 1902 converts a transmission signal from base station apparatus 1901 to an optical signal and transmits the converted optical signal using optical cable 1904. Furthermore, optical transmission apparatus slave unit 1903 converts the optical signal received via optical cable 1904 to an electrical signal and transmits the converted electrical signal to relay apparatus 102. The method of relaying a signal to slave units 104 to 110 following relay apparatus 102 is the same as in Embodiment 1.

Thus, present Embodiment 3 adjusts gain using a pilot signal, thereby correcting the cable loss produced up till arrival at each slave unit. Furthermore, present Embodiment 3 can maintain the output levels from the antennas of individual slave units substantially uniform. Furthermore, present Embodiment 3 cuts the connection between distributor 212 and antenna 214 to prevent a pilot signal from being transmitted from antenna 214, thereby canceling interference against the communication terminal apparatus. Furthermore, according to present Embodiment 3, when transmission of a pilot signal is started, power is temporarily turned off and then turned on, so that it is possible to avoid misjudging that a pilot signal has been received. Furthermore, present Embodiment 3 continues adjusting gain until gain adjustment is finished for all of the serially connected slave units, thereby enabling optimal gain adjustment for all of serially-connected slave units. Furthermore, present Embodiment 3 stores the values of the attenuation factors set in non-volatile memory 302, so that it is possible to continue using values that have been set once, even if power is turned off unexpectedly because of power failure and so on. Furthermore, present Embodiment 3 can correct loss produced upon distribution in distributor 111 (i.e. distribution loss) with the cable loss at the same time.

Present Embodiment 3 is not limited to a case where slave units 104 to 110 are applied, but slave unit 1510 of Embodiment 2 may be applied instead of slave units 104 to 110 in FIG. 19.

Embodiment 4

Figure 20:
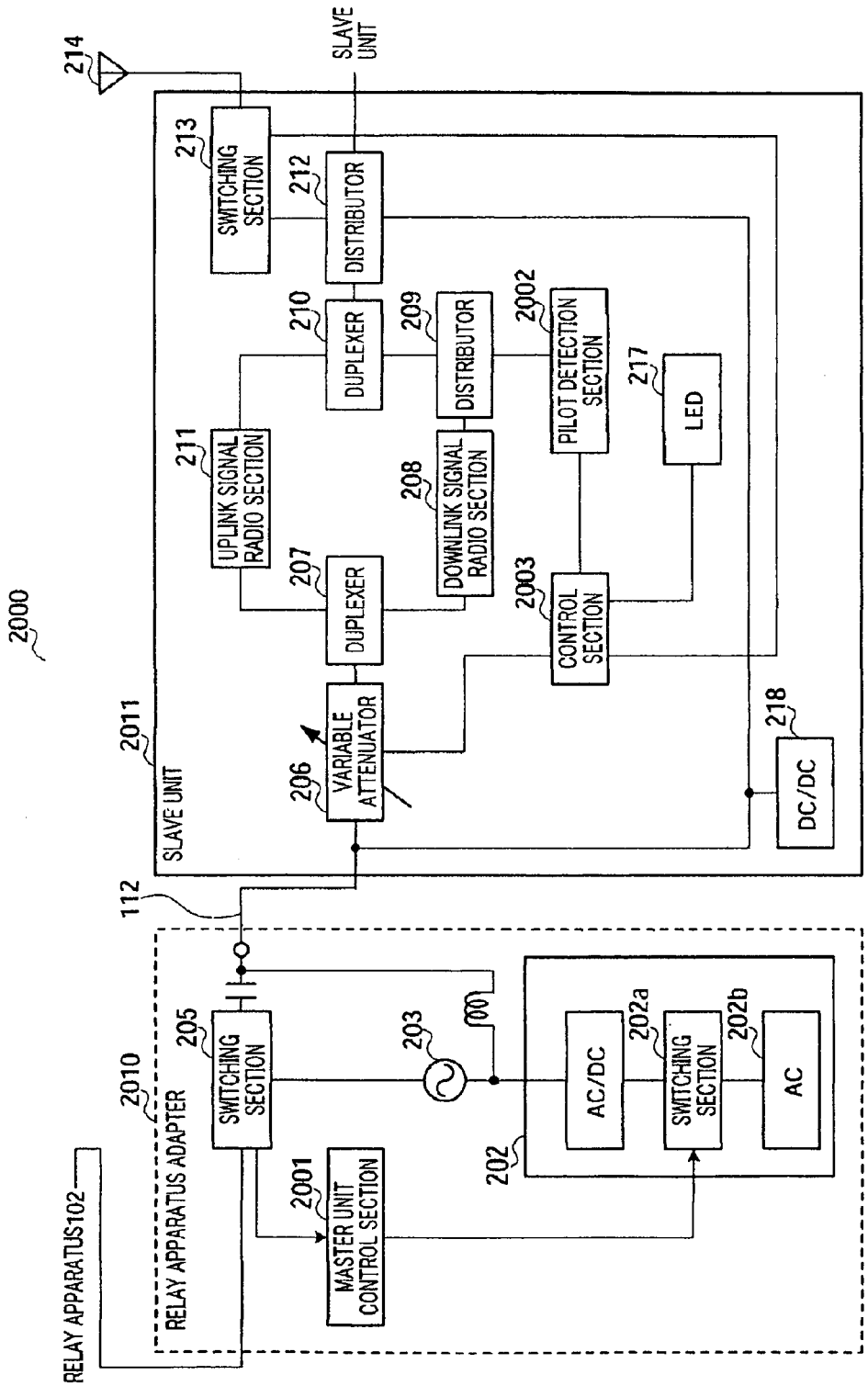
FIG. 20 shows an extension slave unit system according to Embodiment 4 of the present invention.

FIG. 20 shows a configuration of extension slave unit system 2000 according to Embodiment 4 of the present invention.

As shown in FIG. 20, extension slave unit system 2000 according to present Embodiment 4 removes switching section 204 from extension system 100 according to Embodiment 1 shown in FIG. 2, includes master unit control section 2001 instead of master unit control section 201 and includes pilot detection section 2002 instead of pilot detection section 215 and includes control section 2003 instead of control section 216. In FIG. 20, parts having the same configurations as those in FIG. 2 will be assigned the same reference numerals and their explanations will be omitted. Furthermore, the extension system according to present Embodiment 4 is the same as extension system 100 in FIG. 1 except including relay apparatus adapter 2010 instead of relay apparatus adapter 103 in FIG. 1 and including slave unit 2011 instead of slave units 104 to 110, and therefore their explanations will be omitted.

Upon detecting that switching section 205 is switched from the operation mode to the measurement mode, master unit control section 2001 controls power control section 202 to turn off and then turn on the power.

Power control section 202 supplies power to DC/DC 218 under the control of master unit control section 2001 via coaxial cable 112, and supplies power to pilot signal generation section 203.

Switching section 205 can switch between the operation mode and the measurement mode. To be more specific, when the mode is switched to the operation mode, switching section 205 performs a relay, which is the processing of transmitting a downlink signal received as input from relay apparatus 102 to variable attenuator 206 via coaxial cable 112 and then also performs a relay, which is the processing of transmitting an uplink signal received as input from variable attenuator 206 to relay apparatus 102 via coaxial cable 112. Furthermore, when the mode is switched to the measurement mode, switching section 205 transmits a pilot signal received as input from pilot signal generation section 203 to variable attenuator 206 via coaxial cable 112.

Distributor 209 divides the pilot signal and downlink signal received as input from downlink signal radio section 208 into two sequences, outputs one of the two sequences of the pilot signal and the downlink signal to duplexer 210 and the other sequence to pilot detection section 2002.

Pilot detection section 2002, which is a reception level detection means, detects a pilot signal from among the pilot signals and downlink signal received as input from distributor 209. For example, pilot detection section 2002 detects a pilot signal using a band limiting filter that allows only a pilot signal having a specific frequency to pass. Pilot detection section 2002 then outputs the detected pilot signal to control section 2003. Furthermore, pilot detection section 2002 detects the reception level of the detected pilot signal and outputs reception level information, which is the information about the detected reception level, to control section 2003.

When deciding whether or not a pilot signal has been received, control section 2003, which is a pilot signal reception deciding means and gain adjusting means, decides whether or not a pilot signal has been received based on the reception level information received as input from pilot detection section 2002. Upon detecting a signal at a predetermined level, control section 2003 decides that a pilot signal has been received. Upon deciding that a pilot signal has been received, control section 2003 sets attenuation factors that match the cable loss, which is the amplitude loss in coaxial cable 112 based on the reception level information received as input from pilot detection section 2002, and controls variable attenuator 206 for attenuation at the set attenuation factors. Furthermore, control section 2003 controls switching section 213 not to output the pilot signal received as input from distributor 212 to antenna 214 immediately after power is turned on. Furthermore, when a predetermined time has passed after the setting of attenuation factors started, control section 2003 controls LED 217 to inform that the measurement mode has finished. Furthermore, control section 2003 of slave unit 107 to 110 sets attenuation factors that match the distribution loss, which is amplitude loss produced when distributor 111 distributes a downlink signal, in addition to the attenuation factors that match the cable loss, and controls variable attenuator 206 for attenuation at the set attenuation factors.

LED 217 emits light under the control of control section 2003 and informs to the outside by emitting light that the measurement mode has finished.

Variable attenuator 206 adjusts gain by attenuating the pilot signal and downlink signal received as input from switching section 205 of relay apparatus adapter 2010 via coaxial cable 112 and the uplink signal received as input from duplexer 207 at the attenuation factor set by control section 2003. Variable attenuator 206 then outputs the attenuated pilot signal and downlink signal to duplexer 207 and outputs the attenuated uplink signal to switching section 205 of relay apparatus adapter 2010 via coaxial cable 112. Furthermore, variable attenuator 206 can fix or make variable the attenuation factors.

Figure 21:
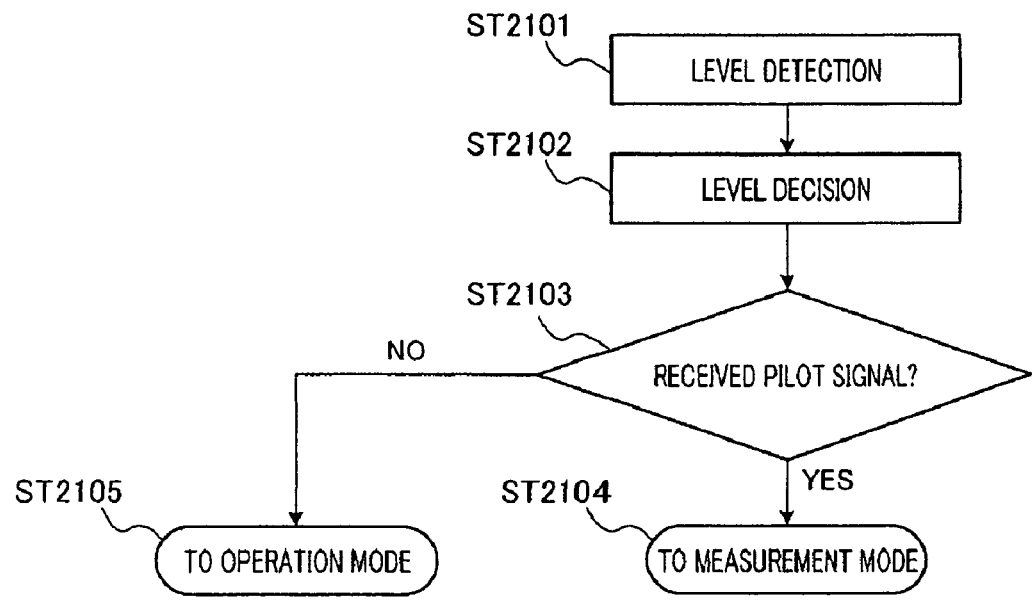
FIG. 21 is a flowchart showing a method of identifying the measurement mode according to Embodiment 4 of the present invention.

Next, the method of deciding whether or not to start the measurement mode in slave unit 2011 will be explained using FIG. 21. FIG. 21 is a flowchart showing the method of deciding whether or not to start the measurement mode. The operations of relay apparatus adapter 2010 according to present Embodiment 4 are the same as in FIG. 4 and FIG. 5 and the same as in FIG. 6 except that step ST 602 in FIG. 6 is deleted, and therefore their explanations will be omitted.

Pilot detection section 2002 detects a pilot signal and also detects the reception level of the detected pilot signal (step ST 2101).

Next, control section 2003 makes a level decision based on the reception level detected by pilot detection section 2002 (step ST 2102).

Control section 2003 decides whether or not a pilot signal has been received based on the level decision result (step ST 2103). For example, control section 2003 compares the detected reception level with a threshold and decides whether or not a pilot signal has been received.

Upon deciding that a pilot signal has been received, control section 2003 performs control in the measurement mode (step ST 2104). On the other hand, upon deciding that a pilot signal has not been received, control section 2003 performs control in the operation mode until power is turned off (step ST 2105).

Figure 22:
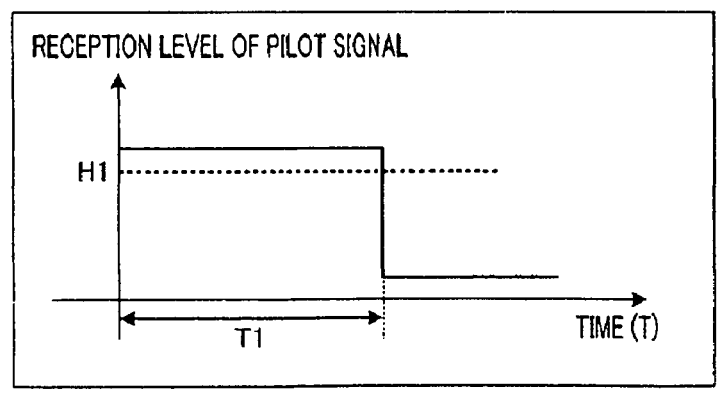
FIG. 22 shows a pilot signal according to Embodiment 4 of the present invention.

FIG. 22 shows a pilot signal. In the case of the measurement mode, switching section 205 outputs a pilot signal of a constant level in a predetermined time T1 as shown in FIG. 22. Furthermore, when the detected reception level is equal to or higher than threshold H1, control section 2003 decides that a pilot signal has been received.

Thus, in addition to the advantage of above Embodiment 1, present Embodiment 4 eliminates the necessity for the switching control in switching section 204 in relay apparatus adapter 2010, thereby reducing the processing in relay apparatus adapter 2010.

Above Embodiment 2 may be applied to present Embodiment 4. That is, adjuster 1501 in FIG. 15 may be provided in FIG. 20 to realize control by the adjuster.

In above Embodiment 1 to Embodiment 4, gain is adjusted using variable attenuator 206, but the present invention is not limited to this, and gain can be adjusted by any arbitrary means. Furthermore, the present invention is not limited to the configurations of the relay apparatus and relay apparatus adapter in above Embodiment 1 to Embodiment 4, but, for example, the relay apparatus and relay apparatus adapter may be configured physically as one apparatus. Furthermore, the configuration of the extension slave unit system is not limited to above Embodiment 1 to Embodiment 4 and may adopt, for example, a configuration in which the relay apparatus adapter and each slave unit have one-to-one correspondence and the number of slave units need not be the same as in the above embodiments. Furthermore, the slave units in above Embodiment 1 to Embodiment 4 are not limited to the configurations of the embodiments in FIG. 2, FIG. 15 and FIG. 20 and some functions may be changed in such a case where there is no LED 217 or a case where switching section 213 and distributor 212 are configured as one component. Furthermore, in above Embodiment 1 to Embodiment 4, the operations are shown in the flows in FIG. 4, FIG. 5, FIG. 6, FIG. 8, FIG. 9, FIG. 10, FIG. 14, FIG. 17, FIG. 18 and FIG. 21 and so on as embodiments of control operation thereof, but the order and configuration thereof are not limited to the above-described flows and the order may be partially changed or some functions may be omitted or changed.

The disclosure of Japanese Patent Application No. 2006-324687, filed on Nov. 30, 2006, including the specification, drawings and abstract, is incorporated herein by reference in its entirety.

INDUSTRIAL APPLICABILITY

The extension slave unit system and signal relay method according to the present invention are suitable for use in radio communication in a poor radio wave environment such as indoor environment.

The invention claimed is:

1. An extension slave unit system connected with a mobile communication relay apparatus for extending a communicable area of the mobile communication relay apparatus, the extension slave unit system comprising a relay apparatus adapter connected with the mobile communication relay apparatus, and at least one extension slave unit apparatus connected with the relay apparatus adapter via a cable, wherein:

the relay apparatus adapter comprises:
a pilot signal generation section that repeats generating a pilot signal having a specific pattern a plurality of times; and
a switching section that switches between a mode of transmitting the pilot signal generated in the pilot signal generation section to the at least one extension slave unit apparatus and a mode of transmitting a downlink signal received by the mobile communication relay apparatus to the at least one extension slave unit apparatus and transmitting an uplink signal received by the at least one extension slave unit apparatus to the mobile communication relay apparatus; and the at least one extension slave unit apparatus comprises:
a reception level detection section that detects a reception level of the pilot signal or the downlink signal received via the cable;
a pilot signal reception decision section that decides, upon detecting a match between a pattern of a transition of the reception level over time detected in the reception level detection section and the specific pattern, that the pilot signal has been received;

a mode deciding section that decides a measurement mode when the pilot signal reception decision section decides that the pilot signal has been received, and decides an operation mode when the pilot signal reception decision section decides that a signal other than the pilot signal has been received; and a gain adjustment section that determines, when the mode deciding section decides that the mode is the measurement mode, a gain adjustment value that matches an amount of amplitude loss by the cable based on a difference between the reception level of the pilot signal detected in the reception level detection section and a predetermined reference value, and adjusts gains of the uplink signal and the downlink signal using the gain adjustment value when the mode deciding section decides that the mode is the operation mode.

2. The extension slave unit system according to claim 1, wherein the gain adjustment value is a fixed value.

3. The extension slave unit system according to claim 2, wherein:

the at least one extension slave unit apparatus comprises a storage section that stores the gain adjustment value determined by the gain adjustment section, and the gain adjustment section adjusts gains of the uplink signal and the downlink signal using the gain adjustment value read from the storage section.

4. The extension slave unit system according to claim 1, wherein:

the at least one extension slave unit apparatus comprises:
an antenna for transmitting and receiving a signal; and
an antenna switching section for controlling whether or not to allow the antenna to operate; and the antenna switching section controls not to allow the antenna to operate when the mode deciding section decides that the mode is the measurement mode and controls to allow the antenna to transmit and receive the uplink signal and the downlink signal when the mode deciding section decides that the mode is the operation mode.

5. The extension slave unit system according to claim 4, wherein:

the at least one extension slave unit apparatus comprises another extension slave unit apparatus connected with the at least one extension slave unit apparatus via another cable; and the at least one extension slave unit apparatus comprises a distributor for distributing the downlink signal subjected to gain adjustment in the gain adjustment section to the another extension slave unit apparatus and the antenna.

6. The extension slave unit system according to claim 4, wherein:

the at least one extension slave unit apparatus comprises another extension slave unit apparatus connected with the at least one extension slave unit apparatus via another cable, the another extension slave unit apparatus comprises an antenna for transmitting and receiving a signal, and an output level of the downlink signal from the antenna of the extension slave unit apparatus is substantially equal to an output level of the downlink signal from the antenna of the another extension slave unit apparatus.

* * * * *